United States Patent
Borgmann et al.

(10) Patent No.: US 11,712,662 B2
(45) Date of Patent: Aug. 1, 2023

(54) MODULAR FLOW SYSTEM WITH INTERNAL STRUT MEMBERS

(71) Applicant: EVCON GMBH, Pliening-Landsham (DE)

(72) Inventors: Norbert Borgmann, Munich (DE); Markus Wenzel, Unterhaching (DE); Wolfgang Heinzl, Ramerberg (DE)

(73) Assignee: EVCON GMBH, Pliening-Landsham (DE)

( * ) Notice: Subject to any disclaimer, the term of this patent is extended or adjusted under 35 U.S.C. 154(b) by 302 days.

(21) Appl. No.: 16/972,820

(22) PCT Filed: Jun. 8, 2018

(86) PCT No.: PCT/EP2018/065216
§ 371 (c)(1),
(2) Date: Dec. 7, 2020

(87) PCT Pub. No.: WO2019/233607
PCT Pub. Date: Dec. 12, 2019

(65) Prior Publication Data
US 2021/0245104 A1    Aug. 12, 2021

(51) Int. Cl.
*B01D 61/36* (2006.01)
*B01D 63/08* (2006.01)
*B01D 69/10* (2006.01)

(52) U.S. Cl.
CPC ......... *B01D 61/366* (2013.01); *B01D 61/362* (2013.01); *B01D 61/364* (2013.01);
(Continued)

(58) Field of Classification Search
CPC .. B01D 61/366; B01D 61/362; B01D 61/364; B01D 63/084; B01D 69/10;
(Continued)

(56) References Cited

U.S. PATENT DOCUMENTS 3,563,860 A    2/1971    Henderyckx
3,834,544 A    9/1974    Tyson et al.
(Continued)

FOREIGN PATENT DOCUMENTS

AU    200052551 A1    12/2000
AU    2007314728 A1    5/2008
(Continued)

OTHER PUBLICATIONS

Wenzel et al., "Modular Flow System with Enhanced Vapor and/or Liquid Channel Configuration", U.S. Appl. No. 16/972,774, filed Dec. 7, 2020.
(Continued)

*Primary Examiner* — Pranav N Patel
(74) *Attorney, Agent, or Firm* — MH2 Technology Law Group LLP

(57) ABSTRACT

The invention relates to a modular flow system having a plurality of frame elements (101, 102) configured to be combined together to form a stack for forming a functional member such as in particular a membrane distillation stage, a vapor generator, a condenser, a heat exchanger, a filter and/or a pervaporation stage, wherein the frame elements (101, 102) each include: an outer frame (39) and an inner frame (43), the inner frame (43) encasing a central inner region (40) and being surrounded by the outer frame (39), passage openings (13 to 16) and vapor and/or liquid channels (17, 18) arranged between the outer frame (39) and the inner frame (43), wherein at least one of the vapor and/or liquid channels (17, 18) comprises at least one internal strut member (48) extending between the inner frame (43) and the outer frame (39).

22 Claims, 7 Drawing Sheets

(52) U.S. Cl.
CPC ........... *B01D 63/084* (2013.01); *B01D 69/10* (2013.01); *B01D 2311/2649* (2013.01); *B01D 2313/025* (2013.01); *B01D 2313/221* (2022.08); *B01D 2313/54* (2013.01)

(58) Field of Classification Search
CPC ...... B01D 2311/2649; B01D 2313/025; B01D 2313/221; B01D 2313/54; B01D 63/082; B01D 2313/08; B01D 2319/02; B01D 2319/04; B01D 2313/22; B01D 2311/2669; B01D 2317/04; B01D 2317/06; B01D 2313/06; C02F 1/447; C02F 1/04; C02F 2301/08; C02F 2201/007
See application file for complete search history.

(56) References Cited

U.S. PATENT DOCUMENTS

| | | | |
|---|---|---|---|
| 4,430,218 | A | 2/1984 | Perl et al. |
| 4,650,574 | A | 3/1987 | Hilgendorff et al. |
| 4,879,041 | A | 11/1989 | Kurokawa et al. |
| 5,829,517 | A | 11/1998 | Schmid et al. |
| 2012/0048803 | A1 | 3/2012 | Shapiro |
| 2014/0216916 | A1 | 8/2014 | Heinzl |
| 2016/0074812 | A1 | 3/2016 | Lienhard et al. |
| 2016/0158702 | A1 | 6/2016 | Saask |
| 2017/0014773 | A1 | 1/2017 | Swaminathan et al. |
| 2017/0197181 | A1 | 7/2017 | Benton et al. |
| 2017/0368506 | A1 | 12/2017 | Mitra et al. |
| 2020/0385338 | A1 | 12/2020 | Antony Prince |

FOREIGN PATENT DOCUMENTS

| | | |
|---|---|---|
| AU | 2013350313 A1 | 6/2015 |
| AU | 2016250821 A1 | 12/2017 |
| DE | 10 2004 013647 A1 | 10/2005 |
| DE | 10 2007 028814 A1 | 2/2008 |
| DE | 10 2009 020179 A1 | 11/2010 |
| DE | 102014110746 A1 | 2/2016 |
| EP | 1185356 B1 | 2/2003 |
| EP | 1609517 A1 | 12/2005 |
| EP | 2106842 A1 | 10/2009 |
| EP | 2156880 A1 | 2/2010 |
| EP | 2363197 A2 | 9/2011 |
| EP | 2545983 A1 | 1/2013 |
| EP | 2570469 A1 | 3/2013 |
| EP | 2906331 B1 | 8/2015 |
| JP | S63137705 A | 6/1988 |
| JP | H03052627 A | 3/1991 |
| JP | H07000768 A | 1/1998 |
| JP | 2016 193422 A | 11/2016 |
| KR | 1020160133813 A | 11/2016 |
| WO | 2010/127818 A1 | 11/2010 |
| WO | 2013/151498 A1 | 10/2013 |
| WO | 2014/033052 A1 | 3/2014 |
| WO | 2014058305 A1 | 4/2014 |
| WO | 2017/211738 A1 | 12/2017 |

OTHER PUBLICATIONS

Wenzel et al., "Modular Flow System With Asymmetric or Discontinuous Liquid Passage", U.S. Appl. No. 16/972,848, filed Dec. 7, 2020.

Borgmann et al., "Multistage Membrane Distillation Apparatus", U.S. Appl. No. 16/972,879, filed Dec. 7, 2020.

Heinzl, "Membrane Distillation Apparatus for Producing Water", U.S. Appl. No. 16/972,899, filed Dec. 7, 2020.

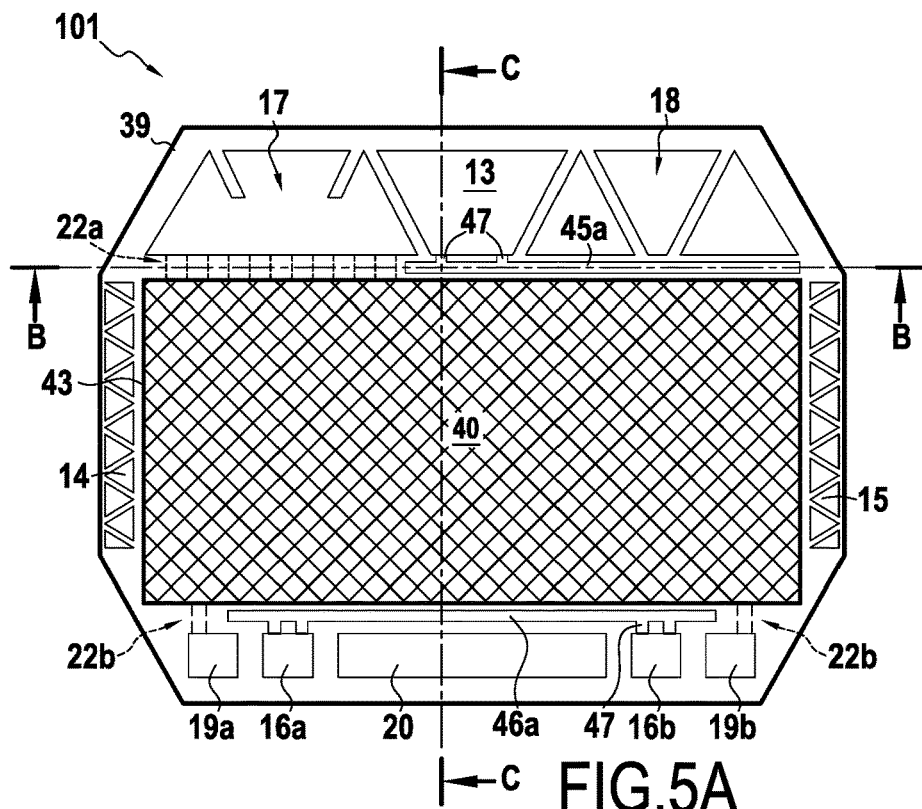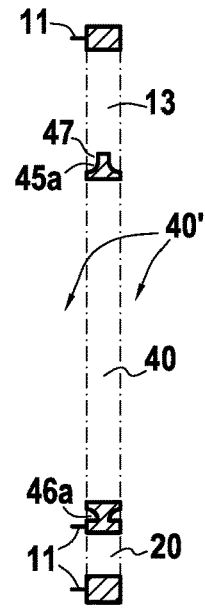
FIG.5A
FIG.5C
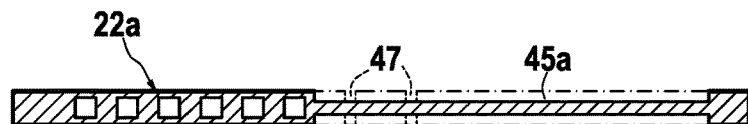
FIG.5B
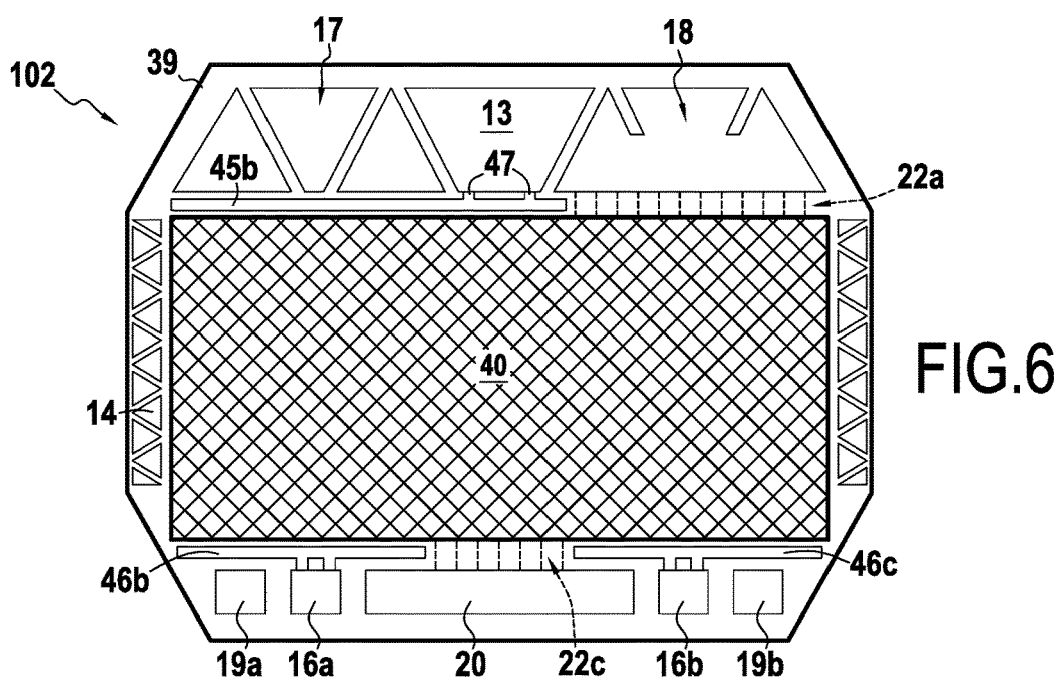
FIG.6

MODULAR FLOW SYSTEM WITH INTERNAL STRUT MEMBERS

FIELD OF THE DISCLOSURE

The present disclosure is related to a modular flow system comprising a plurality of frame elements, in particular to form a multistage membrane distillation apparatus for producing a distillate (e.g. sterile water).

BACKGROUND OF THE DISCLOSURE

Modular flow systems comprising a plurality of frame elements are known e.g. from EP2427263 (A1) (or US2012038069 (A1) of the same family). The plurality of frame elements can be combined by means of welded web structures to various stacks comprising in each case at least two, in particular at least ten frame elements, in order to form different functional units such as in particular a membrane distillation stage, a steam generator, a condenser, a heat exchanger, a filter and/or a pervaporation stage.

The frame elements comprise in each case an outer frame provided with passage openings and vapour and/or liquid channels as well as a central inner region surrounded by the outer frame. The vapour and/or liquid channels are arranged on the left and right sides of a respective frame element when combined together to form the modular flow system.

Moreover, each frame element is provided on both sides with a welded web structure that delimits, on the one hand, the region comprising the passage openings and the central inner region and, on the other hand, at least two regions, each comprising a vapour and/or liquid channel.

In a frame element, as e.g. that described in EP2427263 (A1), the inner region and a feeding area in front of the inner region (in a front view of the frame element), may serve as the active area, in particular for membrane distillation. Said inner region and the feeding area may namely be separated by a vapor-permeable membrane. Hence, the border defined by the membrane between the inner region and the feeding area may serve to transmit vapor and block liquid (i.e. a feed).

However, the inventors have found that the efficiency of the modular flow system described in EP2427263 (A1) is far from a theoretically possible optimum. In particular, it has been found that the described configuration of the frame elements does not allow a significant increase in efficiency.

SUMMARY OF THE DISCLOSURE

Currently, it remains desirable to provide a modular flow system with an increased efficiency.

Therefore, the present disclosure relates to a modular flow system having a plurality of frame elements configured to be combined together to form a stack for forming a functional member such as in particular a membrane distillation stage, a vapor generator, a condenser, a heat exchanger, a filter and/or a pervaporation stage, wherein the frame elements each include: an outer frame and an inner frame, the inner frame encasing a central inner region and being surrounded by the outer frame, passage openings and vapor and/or liquid channels arranged between the outer frame and the inner frame, wherein at least one of the vapor and/or liquid channels comprises at least one internal strut member extending between the inner frame and the outer frame.

Accordingly, a frame element includes an outer frame surrounding an inner frame. The inner frame encases (i.e. borders or defines in its inside) an inner region which desirably is used as an active area of the frame element (as described in more detail in other passages of the present disclosure).

Hence, there remains an available area between the outer frame and the inner frame. In this available area passage openings and vapor and/or liquid channels are arranged.

This configuration leads to a more efficient utilization of the total area inside the frame element, as the complete area between outer and inner frame may be utilized for passage openings and channels. For example, the vapor and/or liquid channels can have an increased size, which can lead to a higher possible output and efficiency of the modular flow system, as described in other passages of the present disclosure.

However, in order to guarantee a structural stiffness (or stability) of the frame elements, the structure forming the vapor and/or liquid channels is reinforced by the at least one internal strut member. Hence, the size of the vapor and/or liquid channels may be increased without decreasing the steadiness (stability) of the frame element.

In particular, the strut members may be provided to connect the outer frame with the inner frame, which can lead to a higher stability. Accordingly, the frame walls may be made thinner.

At least one of the vapor and/or liquid channels may comprise a plurality of adjacent sub-channels which, when the frame elements are stacked together, traverse across the frame elements and have openings between each other in some of the frame elements.

In another or a further aspect, only some of the sub-channels may be connected to the central inner region by a vapor and/or liquid channel opening constituting a through hole in the inner frame.

Accordingly, due to the openings between the sub channels, the liquid or vapor inside the channel can still pass from one side of the internal strut member to the other. Hence, pressure differences can be equalized (balanced). Thus, the channel may also be regarded as one functional channel in spite of the plurality of comprised sub channels.

The sub channels may be separated from each other by an internal strut member.

Accordingly, due to said openings, the liquid or vapor inside the channel can still pass from one side of the internal strut member to the other. Hence, pressure differences can be equalized (balanced). Thus, the channel may also be regarded as one functional channel in spite of the internal strut member separating it in at least two sub channels.

Further, since only some of the sub-channels may be connected to the central inner region by a vapor and/or liquid channel opening, the available area between the outer and the inner frame may be efficiently utilized by the vapor and/or liquid channel. For example, some sub channels may be arranged mores distant to the inner frame, e.g. separated therefrom by another sub channel. In other words, the size of said (total) channel may be increased and at the same time an increased stiffness of the frame element may be guaranteed.

A drain passage may be arranged between the outer frame and the inner frame, the drain passage comprising at least one internal strut member extending between the inner frame and the outer frame.

Hence, the size of the drain passage may be increased without decreasing the steadiness (stability) of the frame element.

At least one internal strut member may be arranged inside the vapor and/or liquid channels, and/or inside the drain passage.

The at least one internal strut member may protrude from the inner frame toward the outer frame, and/or from the outer frame toward the inner frame. The at least one strut member may comprise: at least one connecting internal strut member connecting the inner frame with the outer frame, and/or at least one non-connecting internal strut member protruding from the inner frame toward the outer frame or from the outer frame toward the inner frame without connecting the inner frame with the outer frame.

Accordingly, due to a possible use of connecting internal strut members, the stability of the frame element can be effectively increased.

Further, due to a possible use of non-connecting internal strut members, the liquid or vapor inside the channel can still pass from one side of the internal strut member to the other. Hence, pressure differences can be equalized (balanced). Thus, the channel may also be regarded as one functional channel in spite of the internal strut member separating it in at least two sub channels.

Finally, since frame elements may be stacked such that connecting internal strut members and non-connecting internal strut members are arranged alternately in a vapor and/or liquid channel, the overall stability of the modular flow system, provided by the structure forming said vapor and/or liquid channel can be increased.

Each of the frame elements may include two vapor and/or liquid channels axis-symmetrically arranged in the frame element.

One of the vapor and/or liquid channels may comprise at least one connecting internal strut member, and the other one comprises at least one non-connecting internal strut member.

Each of the frame elements may have a front side and a back side, wherein the frame elements may have a symmetrical configuration such that, when identical first and second frame elements are stacked with facing front sides or facing back sides, the at least one non-connecting internal strut member of the first frame element may be aligned with the at least one connecting internal strut member of the second frame element.

Accordingly, it becomes possible to stack the frame elements in the above described alternated manner by simply turning each second frame element around its symmetry axis.

Said configuration may use identical frame elements (i.e. of the same type, eventually except the use of different membranes and films).

The vapor and/or liquid channel comprising the at least one non-connecting internal strut member may be connected to the central inner region by at least one vapor and/or liquid channel opening constituting a through hole in the inner frame.

The non-connecting internal strut member is desirably not connected to the inner frame. Accordingly, said non-connecting internal strut member may not interfere with the at least one vapor and/or liquid channel opening, which can lead to an easier manufacturing process of the frame element and may provide more available space in the inner frame to dispose the at least one vapor and/or liquid channel opening.

The frame elements may comprise: a first frame element comprising on both sides of the central inner region a film, and a second frame element comprising on both sides a water-tight, vapor-permeable membrane, wherein when the first and second frame elements are stacked, the at least one non-connecting internal strut member of the first frame element is aligned with the at least one connecting internal strut member of the second frame element.

Accordingly, the frame elements may be of a first and of a different second type, e.g. with regard to the use of a film or a membrane and/or with regard to their structural arrangement of strut members, channels, and/or openings.

Thus, it becomes possible to stack the frame elements in the above described alternated manner by simply alternately stacking the first and second frame elements.

The outer frame may include additional outer strut members.

In another or further aspect, the inner frame and the outer frame may be connected by additional intermediate strut members which may be arranged outside the vapor and/or liquid channels and the drain passage.

Accordingly, the stability of the frame element can further be increased and the wall thicknesses can be hence reduced.

The internal strut members may correspond to intermediate strut members (e.g. regarding their thickness).

At least one of the passage openings, the vapor and/or liquid channels, and the drain passage may be bordered on one side by an outer side of the inner frame and on an opposing side by an inner side of the outer frame.

Accordingly the area between the outer frame and the inner frame can be efficiently be utilized by the vapor and/or liquid channels, which can lead to a material reduction and increased channels.

The cross-sectional area ratio of at least one of the vapor and/or liquid channels with regard to the central inner region may be at least 13%, in particular 15%.

In another or further aspect, the cross-sectional area ratio of the entirety of vapor and/or liquid channels with regard to the central inner region may be at least 26%, in particular 30%.

Accordingly, the relative sizes of the vapor and/or liquid channels may be increased in comparison to the systems of the prior art. This is possible due to the new arrangement of the channels above the inner regions, which can allow a more balanced pressure inside the frame element and hence a decreased maximum pressure. In particular, the inventors have found that the defined relative sizes lead to an optimum efficiency of the complete modular flow system.

Indeed, a relative increase of the sizes of the vapor and/or liquid channels also implies a reduction of the active area of the membrane frame. However, due to the increased sizes of the vapor and/or liquid channels, more vapor can be transported to and from the active areas (i.e. the condensation/evaporation areas). Hence, the modular flow system may contain more frame elements in one stage and/or in one module (as described below in more detail), which can increase the efficiency and the output of the flow system. The inventors have found that the described relative sizes lead to an optimum size balance leading to improved total efficiency of the modular flow system.

The vapor and/or liquid channels may be arranged on the same side of the central inner region and/or of the inner frame.

The vapor and/or liquid channels may be arranged on the same side of the central inner region and/or of the inner frame.

This side is desirably above the inner region and/or of the inner frame.

The modular flow system may further comprise:
a condensate collection passage arranged below the inner region in the frame elements, when combined together to form the modular flow system, and/or a condensate collection passage is arranged on an opposite side of the central inner region and/or of the inner frame with regard to the vapor and/or liquid channels.

The condensate collection passage may in particular be connected to the inner region in a (first) frame element, where the inner region is bordered on its front and back side by films. The condensed vapor inside said inner region may thus run out through the condensation collection passage.

The complete cross-sectional area of the vapor and/or liquid channels may be arranged on one side of the cross-sectional area of the central inner region and/or above the cross-sectional area of the central inner region.

In this way, the barrier for any leakage may be raised to its optimum.

The cross-sectional area of the vapor and/or liquid channels may be separated from the cross-sectional area of the central inner region by the inner frame.

Accordingly, the vapor and/or liquid channels may be separated from the central inner region only by the inner frame, e.g. a wall of the inner frame. Hence, the channels are close to the inner region, which can ameliorate the (vapor) transport between the channels and the inner regions and utilizes efficiently the space in the frame element above the inner region.

At least one passage opening may be centrally arranged between the vapor and/or liquid channels.

Accordingly, a feed can be supplied to a central area above the inner region.

On mutually opposite sides of each frame element there may be provided at least one passage opening, respectively.

Accordingly, further passage openings (in addition to a feed supply above the inner region) may be provided below the inner region, e.g. as a feed drain. Further passage openings may be provided on the left and on the opposite right and left side of the inner region. These may be used for additional functions of the modular flow system, other than a membrane distillation.

The passage openings and the vapor and/or liquid channels may be arranged on two opposing sides of the inner frame. For example, they may be arranged such that the other two opposing sides of the inner frame contact the outer frame without any passage opening or vapor and/or liquid channel in between.

Alternatively, on at least one of the other two opposing sides at least one passage opening is provided for other functions of the modular flow system than a membrane distillation stage.

According to the first alternative, the outer shape of the frame element may be effectively converged toward a circle form, in spite of an enlarged (i.e. relatively broad and therefore, increased) inner region.

According to the second alternative, the areas inside the frame element left and right of the inner region may be available for additional channels of the flow system.

The inner frame may comprise a rectangular form, and/or the outer frames and/or frame elements may comprise a octagonal form.

Accordingly, the form of the outer frame may approximate a circular form, when having a octagonal form. Therefore, the pressure inside the frame element can balanced, which can reduce the maximum pressure and hence allows thinner walls and increased openings, channels and inner region.

Desirably the vapor and/or liquid channels have a trapezoidal form. In this case they can efficiently fill the area above the (desirably rectangular) inner region in a frame element having a octagonal form. The frame wall of first and/or opposite second frame sides may extend lineally.

The frame elements and/or their outer frames may comprise at least one planar outer side, in particular a planar bottom.

Due to the planar outer side, in particular a planar bottom the frame element may be easily and reliably be placed, which the inventors have found to simplify the installation of a modular flow system.

The frame elements may comprise two vapor and/or liquid channels, wherein only one of the two vapor and/or liquid channels is connected to the central inner region by a vapor and/or liquid channel opening.

Accordingly, in a frame element one of the two vapor and/or liquid channels may transport vapor (or liquid) from or to the inner region. The other of the two channels may thus pass said frame element ant transport vapor (or liquid) which is not processed in said frame element but only in an adjacent element. Due to this configuration, it is possible to employ first and second frame elements of different types (e.g. film type, membrane type) and different functions (e.g. condensation and evaporation), as described in more detail below.

The frame elements may have a front side and a back side and are stacked in alternating orientation in the modular flow system, such that the front sides of adjacent frame elements face each other and the back sides of adjacent frame elements face each other, in particular in case the frames form a condenser.

Accordingly, in case the frame elements form e.g. a condenser, they may be of identical type, and may be stacked in inverse orientation (e.g. turned around the vertical symmetry axis)

The frame elements may comprise: a first frame element comprising on both sides of the central inner region a film, and a second frame element comprising on both sides a water-tight, vapor-permeable membrane.

Accordingly, the first frame element may server as a condenser (i.e. condensation unit) of a supplied vapor.

The second frame element may serve as an evaporator of a supplied feed.

In the first frame element only a first of the two vapor and/or liquid channels may be connected to the central inner region by a vapor and/or liquid channel opening.

In the second frame element only the second of the two vapor and/or liquid channels may be connected to the central inner region by a vapor and/or liquid channel opening.

The frame element may comprise on both sides of the central inner region a film or on both sides a water-tight, vapor-permeable membrane.

In the modular flow system frame elements with a film and frame elements with a water-tight, vapor-permeable membrane may be stacked alternately.

Accordingly, the first frame element may be supplied with vapor of a first temperature via the first of the two vapor and/or liquid channels, in order to condense the vapor in its inner region.

The adjacent second frame element may receive via a membrane vapor from a region between the first and second frame elements (i.e. a feeding area). The feeding area may be supplied with a feed which vaporizes due to the heat transferred by the condensing vapor in the first frame element. The vapor of the second frame element (which e.g. has a second temperature slightly lower than the first temperature) may leave its inner region via the second of the two vapor and/or liquid channels.

Said configuration allows e.g. parallel connection of a plurality of first frame elements and a plurality of second frame elements.

In the first frame element the central inner region may further be connected to at least one condensate collection passage by a condensate channel opening constituting a through hole in the inner frame.

In the second frame element the central inner region may be further connected to at least one drain passage by a drain channel opening constituting a through hole in the inner frame.

Accordingly, in the first frame element the condensed vapor may leave the inner region. In the second frame element, any leakage may leave the inner region.

The drain passage may be separated in the frames from the condensate collection passage.

Furthermore, the present disclosure may further relate to a modular flow system having a plurality of frame elements configured to be combined together to form a stack for forming a functional member. This functional member may be in particular a membrane distillation stage, a vapor generator, a condenser, a heat exchanger, a filter and/or a pervaporation stage. The frame elements each include:

an outer frame and an inner frame, the inner frame encasing a central inner region and being surrounded by the outer frame, and passage openings and vapor and/or liquid channels arranged between the outer frame and the inner frame.

At least one of the two vapor and/or liquid channels is connected to the central inner region by at least one vapor and/or liquid channel opening constituting a through hole in the inner frame.

In the frame elements, when combined together to form the modular flow system, the vapor and/or liquid channels are arranged above the inner region.

In the present disclosure, when the orientation and/or positioning of elements of the frame elements is described, the frame element is viewed in a front view, if not otherwise indicated.

The passage openings and vapor and/or liquid channels desirably extend in a direction perpendicular to the plane defined by the frame element. In other words, they are desirably oriented in the direction of the front view of the frame element.

The vapor and/or liquid channels may differ from (at least one of) the passage openings, in that the channels are bordered by a welding web structure in an area between two adjacent frame elements, as described in more detail below. The passage openings may not be bordered, such that there may be a liquid and/or vapor connection between a passage opening and an area between two adjacent frame elements.

The vapor and/or liquid channel opening constituting a through hole in the inner frame may extend in a direction parallel to the plane defined by the frame element. In other words, vapor and/or liquid channel opening is desirably oriented in the direction perpendicular to the front view of the frame element.

Accordingly, there is provided a vapor and/or liquid channel opening between at least one (desirably only one) of the vapor and/or liquid channels and the inner region. Said vapor and/or liquid channel opening may be e.g. a through hole in a frame wall of the inner frame. Said frame wall may hence separate the inner region form the vapor and/or liquid channels. Accordingly, vapor may be transported via a vapor and/or liquid channel and a respectively connected vapor and/or liquid channel opening from or to the inner region.

As described in more detail below, the inner region (and desirably also the feeding area in front of the inner region in a front view of the frame element) may serve as the active area, in particular for membrane distillation. Said inner region and the feeding area may namely either be separated by a film, foil, or other heat transmitting and gas and liquid tight material, or by a vapor-permeable membrane. Hence, in case a film or there like is used, the border between inner region and feeding area may serve for heat transfer. In case a membrane is used, the border may serve to transmit vapor and block liquid (i.e. the feed).

However, it is possible that liquid (i.e. feed or liquid) passes the membrane, e.g. due to defects in the membrane. Said liquid (i.e. leakage) should be separated from the (clean) vapor.

In the present disclosure, since the vapor and/or liquid channels are arranged above the inner region in the modular flow system (i.e. desirably with regard to the gravitational direction pointing downwards), the whole inner region may serve as a barrier for leakage. In other words, the leakage would need to fill the complete inner region, in order to pass the barrier, i.e. to flow into a vapor and/or liquid channel arranged above the inner region. Hence, any contamination of the final product (i.e. the distillate) can be effectively prevented.

Furthermore, it is not necessary to provide any further barrier (e.g. a barrage) in the frame element, in particular in the inner region. As a further consequence, the material of the frame element can be reduced.

Due to the raised barrier the relative size of the active area can also be increased. Any increased amounts of leakage (which are normal due to the increased size of the active area) are namely effectively blocked by the barrier provided by the frame configuration of the present disclosure.

The vapor and/or liquid channels can efficiently use the space in the frame element above the inner region. Therefore, the frame element can have an outer shape which converges toward a circle form (e.g. by having the form of an octagon). In a circle form the pressure inside the frame element is ideally balanced. Therefore, the frame configuration of the present disclosure allows a reduced material use (i.e. thinner walls), as the maximum pressure in the frame element can be reduced compared to e.g. an elongated frame element form. As a further consequence, due to the material reduction the relative size of the inner region, the channels and passage opening can be increased, which can ameliorate the efficiency of the modular flow system.

The central inner region may be hollow or comprises a grid-like spacer.

The central inner region of a respective frame element may be provided with a spacer, in particular a grid-like spacer.

Accordingly, the inner region may serve as an active area which e.g. receives vapor. Furthermore, a membrane or film may be reliably fixed on the front and back side of the grid-like spacer.

The central inner region may be provided with a spacer, in particular a grid-like spacer.

A respective film or membrane may be arranged, in particular welded, on the two sides of the spacer.

The central inner region and the feeding area may be separated by a film or a membrane.

A respective film or membrane may cover the total spacer but the passage openings and the vapor and/or liquid channels may be kept free.

In the modular flow system frame elements with a film and frame elements with a water-tight, vapor-permeable membrane may be stacked alternately.

The vapor and/or liquid channels may be arranged next to each other. In another or further aspect, the vapor and/or liquid channels may be bordered on one side by an outer side of the inner frame and on an opposing side by an inner side of the outer frame.

Each frame element may be provided on at least one side with a respective welding web structure which, on the one hand, defines a region including the passage openings and the central inner region and, on the other hand, defines at least two regions each including a vapor and/or liquid passage.

Each frame element may be provided on only one frontal side only or on both opposing frontal and back sides with a welding web structure which defines a region including the passage openings and the central inner region and defines at least two regions each including a vapor and/or liquid passage.

Accordingly, due to the welding web structure the stacked frame elements may be reliably secured to each other. Further, the single channels and openings of the frame elements may be tightly separated from each other, i.e. in a gas and liquid tight manner.

The vapor and/or liquid channels and/or the passage opening and/or the welding web structure of each of the stacked frame elements may be aligned with one another, respectively.

In other words, in each of the stacked frame elements at least one of the vapor and/or liquid channels, the passage opening, and/or the welding web structure may be aligned with one another, respectively.

Accordingly, due to the matching form of the frame elements (e.g. aligned openings) channels may be formed which traverse the stack of frame elements.

The at least one welding web structure may protrude from the frame element such that a space constituting the feeding area is provided between the respective inner frames of stacked adjacent frame elements.

Accordingly the welding web structure may be configured to have such a thickness corresponding to the thickness of the desired space constituting the feeding area.

The present disclosure may further relate to a modular flow system having a plurality of frame elements configured to be combined together to form a stack for forming a functional member such as in particular a membrane distillation stage, a vapor generator, a condenser, a heat exchanger, a filter and/or a pervaporation stage.

The frame elements each include an outer frame surrounding passage openings, vapor and/or liquid channels, and a central inner region.

Each frame element is provided on only one side with a welding web structure which defines a region including the passage openings and the central inner region and defines at least two regions each including a vapor and/or liquid passage.

Accordingly, only one welding web structure is arranged between two adjacent frame elements in the stacked arrangement of the modular flow system. Therefore, the distance between the adjacent frame elements can be reduced. The resulting area or gap (also referred to as feeding area) between the frame elements may be used to be supplied with a (liquid) feed. Said (thin) area may be heated on a first side (e.g. by a film limiting said area on a first side) and have a membrane on the opposite second side for vapor evaporation toward a second frame. As a consequence the efficiency of the flow system, in particular of an evaporation of the feed can be increased due to ameliorated heat transfer.

Moreover, since there is only one welding web structure between two adjacent frame elements, the frame adjustment of the two frame elements can be simplified and thus made be more reliable. In comparison to the use of two facing welding web structures, it is in the present disclosure relatively easy to align the one welding web structure of a first frame element with a facing flat surface of an adjacent second frame element. Therefore, the welding web structure may have in total an increased welding web and/or may have a more complex form. For example, it may also be provided on structural elements of the frame member, as e.g. strut members. Consequently, the steadiness of the frame element (due to the structural elements) and of the adjacent frame elements (due to the increased welding web) may be fixed to each other more securely. Thus, the material of the frame elements (i.e. the wall thicknesses) is reduced, which can lead to an increase of available space for the active area and channels, openings and there like.

The outer frame may include outer strut members, the outer strut members being provided with the welding web structure.

The outer strut members may be provided with the welding web structure.

Accordingly, outer strut members may be provided inside the outer frame, e.g. in order to reinforce its structure. The outer frame may thus be partially hollow or have internal openings. Accordingly, the frame walls may be made thinner. Openings inside the frame may be used for channels.

Since the outer strut members may have a welding web structure on their front or back side (in a front view of the frame member), the size of the welding web structure may be increased, which can lead to a steadier connection between adjacent frame elements fixed to each other by the welding web structure.

The inner frame and the outer frame may be connected by intermediate strut members, the intermediate strut members being provided at least partially with the welding web structure.

Accordingly, intermediate strut members may be provided to connect the outer frame with the inner frame, e.g. in order to reinforce the structure of the frame element. The frame element may thus be partially hollow or have internal openings between outer and inner frame. Accordingly, the frame walls may be made thinner. Openings between outer and inner frame may be used for channels.

Since the intermediate strut members may have a welding web structure on their front or back side (in a front view of the frame member), the size of the welding web structure may be increased, which can lead to a steadier connection between adjacent frame elements fixed to each other by the welding web structure.

The welding web structure may define together with strut members on which it is provided at least one inoperative channel, said inoperative channel running through the flow system without having any opening inside the stacked frame elements.

Accordingly, there may be at least one opening defined by the strut members and the welding web structure provided thereon which is not used as a channel for liquid or vapor of the modular flow system but which merely has the function to strengthen the structure and reduce material of the flow system.

The welding web structure may define together with strut members on which it is provided at least one at least one passage opening for other functions of the modular flow system than a membrane distillation stage.

Accordingly, there may be at least one opening defined by the strut members and the welding web structure provided thereon which may be used as a channel for another function of the modular flow system than a membrane distillation stage, e.g. for a vapor generator, a condenser, a heat exchanger, a filter and/or a pervaporation stage.

At least one of the vapor and/or liquid channels may comprise at least one internal strut member extending between the inner frame and the outer frame.

The internal strut member may be provided at least partially with the welding web structure.

Accordingly, the structure of the frame element forming the vapor and/or liquid channels may be reinforced by the internal strut member. Hence, the size of the vapor and/or liquid channels may be increased without decreasing the steadiness (stability) of the frame element.

Further, since the internal strut member may be provided partially or over its full extensions with the welding web structure, the stability of the connection (by the welding web structure) of stacked adjacent frame members may be increased.

The welding web structure may provide a welding web configured such that the vapor and/or liquid channels are separated from each other.

The at least one internal strut member may be only partially provided with the welding web.

Accordingly, a welding web may be provided between the vapor and/or liquid channels such that the channels are tightened, or in other words, that no liquid or vapor can pass from one channel to the other.

Further, since the internal strut member inside a vapor and/or liquid channel is only partially provided with the welding web, the liquid or vapor inside the channel can still pass from one side of the internal strut member to the other. Hence, pressure differences can be equalized (balanced). Thus the channel may also be regarded as one functional channel in spite of the internal strut member separating it in at least two sub channels.

The at least one internal strut member may protrude from the inner frame toward the outer frame, and/or from the outer frame toward the inner frame.

The at least one strut member may comprise: at least one connecting internal strut member partially provided with the welding web structure and connecting the inner frame with the outer frame, and/or at least one non-connecting internal strut member provided over its full length with the welding web structure and protruding from the inner frame toward the outer frame or from the outer frame toward the inner frame without connecting the inner frame with the outer frame.

When adjacent first and second frame elements are stacked, the welding web structure of the at least one connecting internal strut member of the first frame element is aligned and matches with the welding web structure of the at least one non-connecting internal strut member of the second frame element.

Accordingly, due to the connecting internal strut member only partially provided with the welding web structure and due to the non-connecting internal strut member, the liquid or vapor inside the channel can still pass from one side of the internal strut member to the other. Hence, pressure differences can be equalized (balanced). Thus the channel may also be regarded as one functional channel in spite of the internal strut member separating it in at least two sub channels.

The welding web structures of internal strut members (connecting and non-connecting) of adjacent frame elements may match each other. Thus, over the full length of the stack (orthogonal to the plane of the frame elements) there may be provided in the same region (in a frontal view of the frame elements) welding web structures between the frame elements. Hence the overall stability of the stack can be increased.

The frame elements may be stacked such that between each pair of adjacent frame elements only one welding web structure is arranged.

This may be achieved by orienting the frame elements accordingly, such that their welding web structures are all protruding to the same direction.

The distance between two adjacent frame elements may be defined by the welding web structure in between, such that the distance is between 0.4 mm to 2 mm, in particular between 0.6 and 0.8 mm.

Accordingly, the distances between adjacent frame elements may be reduced to 0.4 mm to 2 mm, more desirably to a distance between 0.6 and 0.8 mm. Said distance is defined and achieved by the single (i.e. one side) welding web structure between the adjacent frame elements. The inventors have found that due to the relatively small resulting area or gap (also referred to as feeding area) between the frame elements the heat transfer can be ameliorated and thus the efficiency of the flow system, in particular of an evaporation of the feed can be increased.

Adjacent frame elements may be hot plate welded.

With said hot-plate welding technique the inventors have found a technique which allows providing the frame elements on one side only with a welding web structure, which can lead to the mentioned positive effects.

In the prior art, frame elements conventionally are friction welded. In other words, in this technique they may be rubbed on each other, in order to generate a heat leading to welding. However, this conventional technique leads to visible deformations of the frame elements which may also lead to defects of the e.g. a membrane or a film provided by the frame element.

According to the disclosure, such deformations can be avoided. In other words, the frame elements may have a (visibly) more planar surface, in particular in the area of the welding web structure. Further, any potential defects of a membrane or film of the frame elements due to the welding procedure can be reliably avoided.

The present disclosure may further relate to a method of forming a modular flow system, comprising the steps of: providing a plurality of frame elements to form a stack for forming a functional member such as in particular a membrane distillation stage, a vapor generator, a condenser, a heat exchanger, a filter and/or a pervaporation stage, welding the frame elements together using hot plate welding.

As mentioned, the use of hot-plate welding technique allows providing the frame elements on one side only with a welding web structure, which can lead to the described positive effects.

The step of providing the plurality of frame elements may comprise providing each of the plurality of frame elements on only one side with a welding web structure.

The step of providing the plurality of frame elements may comprise providing each of the plurality of frame elements with an outer frame surrounding passage openings, vapor and/or liquid channels, and a central inner region.

Each frame element may be provided on only one side with a welding web structure which defines a region including the passage openings and the central inner region and may define at least two regions each including a vapor and/or liquid passage.

The step of welding the frame elements together may comprise heating a first frame element on the side of its welding web structure and a second frame element on the side without a welding web structure using a hot plate, in particular to 260° C. to 400° C., and pressing the first and second frame elements against each other on their heated sides.

The vapor and/or liquid channels and/or the passage opening and/or the welding web structure of each of the stacked frame elements may be aligned with one another, respectively.

The present disclosure may further relate to a modular flow system having a plurality of frame elements configured to be combined together to form a stack for forming a functional member such as in particular a membrane distillation stage, a vapor generator, a condenser, a heat exchanger, a filter and/or a pervaporation stage, wherein the frame elements each include: an outer frame and an inner frame, the inner frame encasing a central inner region and being surrounded by the outer frame, at least one first passage opening arranged between the outer frame and the inner frame and separated from the central inner region by a frame wall on a first and/or opposite second frame side of the inner frame, and at least one liquid passage provided by the frame wall and configured to distribute a liquid from the first passage opening to a feeding area and/or to collect a liquid from the feeding area to the first passage opening), the feeding area being aligned with the central inner region but being outside and/or in front of the inner frame, wherein the liquid passage extends asymmetrically and/or discontinuously along the first and/or second frame side.

The frame elements may each include a liquid passage provided by a frame wall of the inner frame and configured to distribute a liquid from a first passage opening to a feeding area or to collect a liquid from the feeding area to the first passage opening.

The feeding area may be aligned with the central inner region but may be in front of the boundary of the inner frame and the central inner region.

The liquid passage extends asymmetrically and/or discontinuously along a first and/or second frame side.

The frame wall is desirably a wall of the inner frame on its first and/or second frame side.

The feeding area may be in front of the inner frame or in front of the central inner region, desirably in a front view of the frame element. In other words, the feeding area may be aligned with the central inner region but may be in front of the boundary of the inner frame and the central inner region.

The inner region and the feeding area may be adjacent and/or may overlap in a front view of the frame. The inner region and the feeding area may be separated from each other by a wall member. Said wall member may be e.g. a film, foil (or other heat transmitting and gas and liquid tight material), or by a vapor-permeable membrane.

According to the disclosure, the section of the frame wall where no liquid passage is provided may be used for other functions (e.g. for providing said section with a vapor and/or liquid channel opening constituting a through hole in the frame wall). As a consequence, there is no interference of the liquid passage and the other function. Hence, the thickness of the frame wall (in particular in a front view of the frame member) may be reduced and hence, desirably of the complete frame element. As a consequence, more frame elements may be used in a modular flow system and the heat transfer may be increased due to the reduced thickness. This leads to a higher efficiency and an increased output of the flow system.

The liquid passages of stacked first and adjacent second frame elements may form together a liquid passage extending across the complete first and/or second frame side (i.e. the upper or lower side of the feeding area) of the respectively facing frame walls.

Accordingly, an efficient distribution and collection of the feed by the liquid passage can anyhow be achieved (in spite of the discontinuous or asymmetric form of the liquid passage) by suitably arranging adjacent frame elements, which together may provide a liquid passage extending across (i.e. over the full length of) the respective complete frame walls.

Therefore, the liquid may be distributed (and/or collected) equally over the full extension (i.e. width in a front view of a frame element when positioned in the modular flow system) of the feeding area. This enhances the efficiency of the membrane distillation process, since "dead zone" in the active area can be avoided.

The liquid passage may extend asymmetrically by extending from a central section of the first and/or second frame side into only one direction along the first and/or second frame side without extending into the opposite direction.

In this first example the liquid passage extends asymmetrically, e.g. it is only arranged in a central section and a right section of the frame wall (in a front view of a frame element when positioned in the modular flow system), or in a central section and a left section of the frame wall.

In this first example, it may be possible that the modular flow system comprises frame elements which are identical with regard to the asymmetric liquid section. A second frame element namely can be turned around and stacked on a first frame element, such that the liquid passages of the stacked first and adjacent second frame elements form together a liquid passage extending across the complete first and/or second frame side of the respectively facing frame walls.

Accordingly, a section in the other direction of the frame wall where no liquid passage is provided may be used for other functions (e.g. for providing said section with a vapor and/or liquid channel opening constituting a through hole in the frame wall).

The liquid passage may be configured such that, when a first and an adjacent second frame element are stacked, the respectively facing liquid passages of the first and the second frame elements may be in liquid connection with each other for mutually distributing or collecting the liquid.

The connected liquid passages of the first and the second frame elements may mutually extend across the complete first and/or second frame side.

The connected liquid passages may partially overlap in a front view of the frame elements.

The connected liquid passages may partially overlap e.g. in a central section of the frame wall. In this case, the liquid passage may e.g. be fed by a centrally arranged first passage opening. Hence, alternating frame elements, where the liquid passages alternately extend in a first and an opposite second direction of the frame walls (e.g. to the left and to the right), may have all centrally arranged first passage openings aligned with each other.

The first and/or second frame side may comprise a central region and opposing peripheral regions which partially overlap with the central region on opposing sides, wherein the liquid passage extends discontinuously by extending either across the central region or across the peripheral regions.

In this second example the liquid passage extends discontinuously, e.g. it is only arranged in a central section of the frame wall (in a front view of a frame element when positioned in the modular flow system), or in peripheral left and right sections of the frame wall which partially overlap the central section.

A first liquid passage may be configured to distribute a liquid from the first passage opening to the feeding area. A second liquid passage may be configured to collect a liquid from the feeding area to a second passage opening. The first and second liquid passages may be arranged on opposite sides of the feeding area.

Accordingly, liquid can be fed to the feeding area and collected from the feeding area by providing two liquid passages.

The first passage opening may be a feeding passage opening connected to the first liquid passage. The frame elements each may include at least one second passage opening being a draining passage opening and connected to the second liquid passage. The first and the second passage openings may be arranged on two opposing sides of the inner frame.

Accordingly, liquid can be fed to the first liquid passage and collected from the second liquid passage.

In the frame elements, when combined together to form the modular flow system, a first liquid passage configured to distribute a liquid may be arranged on a first frame side above the feeding area and a second liquid passage configured to collect the liquid may be arranged on a second frame side below the feeding area.

The stacked frame elements may comprise: a first frame element where the liquid passage extends only across the central region, and an adjacent second frame element where the liquid passage extends only across the peripheral regions.

Accordingly, at least in the second example it is desirable to provide two different types of frame elements.

In the first frame element the central inner region may be connected to at least one condensate collection passage by a condensate channel opening constituting a through hole in the inner frame in at least one of the peripheral regions where no liquid passage extends.

In another or a further aspect in the second frame element the central inner region may be connected to at least one drain passage by a drain channel opening constituting a through hole in the inner frame in the central region where no liquid passage extends.

Accordingly, the section or sections of the frame wall where no liquid passage is provided may be used for providing an opening or several openings constituting through holes in the frame wall.

The liquid passage may be a notch provided on a front side of the frame wall or a channel provided inside the frame wall.

Accordingly, the liquid passage may form a notch on the surface of the inner frame, in particular on a front and/or back side of the inner frame.

The liquid passage may be connected to the first passage opening, in particular by a connecting notch provided on a front side of the frame wall or a connecting channel provided inside the frame wall.

Accordingly, a liquid connection may be provided between first passage opening and the (first) liquid passage.

In the same way the (second) liquid passage may be connected to the second passage opening, in particular by a connecting notch provided on a front side of the (second) frame wall or a connecting channel provided inside the (second) frame wall.

The liquid passage may be configured to distribute the liquid to the feeding area or collect the liquid from the feeding area over its whole or at least a part of its extension along the first and/or second frame side.

The frame elements may each further include vapor and/or liquid channels arranged between the outer frame and the inner frame. The vapor and/or liquid channels may be arranged on the first (i.e. upper) side of the inner frame. The vapor and/or liquid channels may be separated from the central inner region by the frame wall. The first passage opening may be centrally arranged between two vapor and/or liquid channels.

Accordingly, a desirable configuration of the vapor and/or liquid channels and the first passage opening can be obtained.

The first passage opening may have a reduced width compared to the first frame side such that it does not extend across the complete first frame side.

The second passage opening may have a reduced width compared to the second frame side such that it does not extend across the complete second frame side.

Accordingly, the first passage opening may not extend across the complete first frame side. Therefore, a liquid passage may be provided to enhance the distribution of the liquid inside the feeding area.

Only one of the vapor and/or liquid channels may be connected to the central inner region by a vapor and/or liquid channel opening constituting a through hole in the inner frame, in particular in the frame wall.

The liquid passage may extend along the frame wall asymmetrically and/or discontinuously, such that the liquid passage does not intersect with the vapor and/or liquid channel opening.

Accordingly, since there is no interference (or overlap) between the vapor and/or liquid channel opening and the liquid passage, the frame wall and the total frame member can have a reduced thickness.

The liquid passage, the first passage opening and the feeding area may be encased by the welding web structure, such that there is a liquid connection between the liquid passage, the first passage opening and the feeding area.

More in particular, the first liquid passage, the second liquid passage, the first passage opening and the feeding area may be encased by the welding web structure, such that there is a liquid connection between the first passage opening, the first liquid passage, the feeding area and the second liquid passage.

Accordingly, liquid may be supplied by the first passage opening, run through the first liquid passage into the feeding area and run out through the second liquid passage, where it may be guided into e.g. a second passage opening. The welding web structure is configured such that said liquid (which is desirably a feed to be processed by the flow system) cannot enter any other areas inside the flow system, in particular in a frame member.

At least one, in particular each of the frame elements may include: at least one liquid passage provided on its front side, and at least one liquid passage provided on its back side.

Accordingly, more than two frame elements may be stacked. For example, a frame element arranged between two other frame elements may provide with both of said two frame elements a mutual liquid connection, respectively, by respective liquid passages on its front and back side.

The at least one liquid passage on the front side may be provided axis-symmetrically to the at least one liquid passage on the back side.

In another or a further aspect the at least one liquid passage on the front side may be connected with the at least one liquid passage on the back side in a front view of the frame element.

Accordingly, in a front view of the frame element the liquid passage may extend on both its front and its back side e.g. to the left or on both its front and its back side to the right.

Furthermore, according to the present disclosure the modular flow system may be (at least a part of) a multistage membrane distillation apparatus, comprising a plurality of multistage membrane distillation modules, the modules being configured to be flowed through in parallel by a liquid to be concentrated. Each module comprises a plurality of serial condensation/evaporation stages configured to be flowed through in series by the liquid to be concentrated.

Each condensation/evaporation stage comprises a plurality of parallel condensation/evaporation elements configured to be flowed through in parallel by the liquid to be concentrated. Each condensation/evaporation element comprises at least one condensation unit and at least one evaporation unit.

The apparatus further desirably comprises at least one of: a centralized heating stage configured to generate steam and to provide the steam to each of the modules in parallel, and a centralized condensation stage configured to receive steam from each of the modules in parallel and to condense the steam.

Accordingly the multistage membrane distillation apparatus has a hierarchical organization with three levels. On the first and highest level, the apparatus comprises a plurality of parallel multistage membrane distillation modules. On the second (lower) level, the apparatus comprises a plurality of serial condensation/evaporation stages. On the third (lowest) level, the apparatus comprises a plurality of parallel condensation/evaporation elements. A condensation/evaporation element may comprise a first and a second frame element or more desirably may be formed by two first frame elements sandwiching a second frame element, as described in the following.

Due to this arrangement the apparatus may comprise up to several thousand condensation/evaporation elements, e.g. by simply combining several thousand first and second frame elements, respectively.

Furthermore, by providing such an apparatus, it is possible that several modules commonly use a centralized (or single) heating stage and/or a centralized (or single) condensation stage. Therefore, the energy consumption of the centralized (or single) heating stage and/or a centralized (or single) condensation stage may be shared by a plurality of parallel modules, which can lead to an optimized energy efficiency of the apparatus and at the same time (due to the use of more than one module) to a higher total output of the apparatus.

The centralized heating stage generates steam (i.e. a vapor) and provides the steam to each of the modules in parallel. Accordingly the modules (i.e. desirably the respective first stages) are heated with the supplied steam. In comparison to supplying (hot) liquid and generating steam individually in the respective modules (e.g. by using a vapor generator as known e.g. from EP 2 427 263 B1), embodiments of the present disclosure have the advantage that due to thermodynamics steam will automatically be attracted most by the coldest surface. Hence, a module which is colder than the others will automatically be heated more. As a consequence, the temperature of the modules (i.e. in particular of their respective first stages) is automatically balanced.

In comparison, heating with (hot) liquid may involve a very precise control implying high effort and reduced reliability.

The same applies to a centralized condensation stage. Due to thermodynamics the vapor (or steam) generated in the last stage of each module will be attracted by the centralized condensation stage depending on the temperature of the vapor. Hence, a module which generates hotter vapor (or steam) in its last stage will automatically supply more steam to the centralized condensation stage and will therefore, be cooled more than the other (colder) modules. As a consequence, the temperature of the modules is automatically balanced.

The centralized heating stage may be configured to provide the steam in each module to a first stage of the serial condensation/evaporation stages.

Accordingly, the first stage of each module may be heated by the centralized heating stage.

The centralized heating stage may be configured to provide the steam in each module to the condensation units of the first stage in parallel, in particular for heating said condensation units to a first predetermined temperature.

The centralized heating stage may be configured to heat the feed (i.e. liquid) to be concentrated to a second predetermined temperature being lower than the first predetermined temperature.

Accordingly, the condensation units of a first stage of each module may be heated by the generated steam. Condensation units of subsequent stages may be heated with the steam (vapor) generated in preceding stages.

In other words, the centralized heating stage may heat the liquid to a second temperature which is slightly lower than the temperature of the generated steam. In this way the steam can heat the liquid in the first stage, such that it vaporizes and a membrane distillation is caused.

The centralized heating stage may be configured as a vapor-liquid separator, in particular as a demister.

In this way, the centralized heating stage may heat the liquid in a vapor-liquid separator, in order to generate the steam at a first temperature and heat the liquid to a desired (lower) second temperature.

In another or a further aspect, the centralized heating stage may comprise a heating device and an evaporation device. The heating device may comprise a heating liquid space configured to heat a liquid and to supply it to the evaporation device. The evaporation device may comprise a steam space at least partly limited by a mesh tab and/or a steam-permeable, liquid-tight membrane wall such that the steam arising from the liquid moves through the mesh tab and/or the membrane wall into the plurality of multistage membrane distillation modules via a plurality of parallel steam passages.

The centralized heating stage may comprise a single heating device and/or a single evaporation device.

Accordingly, the heating stage may be centralized by having only one heating device and/or one evaporation device.

The centralized condensation stage may be configured to receive steam from a last stage of the serial condensation/evaporation stages of each module.

The centralized condensation stage may be configured to receive steam from the evaporation units of the last stage of each module in parallel, in particular for cooling said evaporation units to a third predetermined temperature being lower than the first and the second predetermined temperatures.

Accordingly, the evaporation units of a last stage of each module may be cooled by the centralized condensation stage. Evaporation units of preceding stages may be cooled by subsequent stages (i.e. the condensation units of subsequent stages).

The centralized condensation stage may comprise a cooling device with a cooling liquid space and a condensation device with a steam space, the spaces being separated by a liquid-tight, heat-conducting wall, the steam space being connected to the last stage of each module in parallel via a plurality of respective steam passages.

The centralized condensation stage may comprise a single cooling device with a single cooling liquid space and/or a single condensation device with a single steam space.

Accordingly, the condensation stage may be centralized by having only one cooling liquid space and/or a single condensation device with a single steam space.

Each of the condensation units may comprise a first steam space at least partly limited by a condensation wall, in particular a film. Accordingly, a condensation unit may be a first frame element, as described above.

Each of the respective evaporation units may comprise a second steam space at least partly limited by a steam-permeable, liquid tight membrane wall. Accordingly, a evaporation unit may be a second frame element, as described above.

At least one flow channel (i.e. a feeding area) for the liquid to be concentrated may be provided between a condensation unit and an adjacent evaporation unit such that the liquid inside the flow channel is heated via the condensation wall and the steam arising from the liquid to be concentrated moves through the membrane wall into the second steam space.

In each condensation/evaporation stage the evaporation units and condensation units may be arranged, in particular stacked, alternately.

The evaporation units may have steam outlet passages (i.e. vapor and/or liquid channels) connected with another, in particular facing one another and/or being aligned with each other. The condensation unit may have steam inlet passages (i.e. other of the two vapor and/or liquid channels) connected with another, in particular facing one another.

Accordingly, the evaporation and condensation units may be stacked alternately. By this configuration a set of parallel connected evaporation and condensation units, i.e. of evaporation and condensation elements, may be obtained.

The steam outlet passages of the evaporation units of a preceding stage may be connected to the steam inlet passages of the condensation units of a successive stage for forming a steam channel providing steam from the preceding stage to the successive stage.

Said units may be in particular arranged such that the respective steam outlet passages of the preceding stage and the respective steam inlet passages of the successive stage face one another.

This is e.g. possible by turning the frame elements of a subsequent stage around their vertical symmetry axis.

The evaporation units may comprise passage openings facing the steam inlet passages of the condensation units.

The condensation units may comprise passage openings facing steam outlet passages of the evaporation units.

Said passage openings may correspond to vapor and/or liquid channels which are not connected to the inner region by channel openings.

More desirably in an evaporation unit the steam outlet passage and the passage opening may be symmetrical, and In an condensation unit the steam inlet passage and the passage opening may be symmetrical.

The steam outlet and the steam inlet may each correspond to a vapor and/or liquid channel which is connected to the inner region by channel openings.

Each condensation/evaporation element may comprise a single stack of frame elements providing the respective condensation units and evaporation units of the condensation/evaporation element. For example, a condensation/evaporation element may be formed by two condensation units sandwiching an evaporation unit. In case of a stack of alternating condensation and evaporation units, a condensation unit may hence be shared by two adjacent condensation/evaporation element.

Each condensation/evaporation stage may be formed by a single stack of frame elements providing the parallel condensation/evaporation elements.

Each module may be formed by a single stack of frame elements providing the serial condensation/evaporation stages.

The apparatus may be configured as a modular flow system comprising a plurality of frame elements. The different functional units such as in particular a respective condensation unit or a respective evaporation unit may be each provided in the form of such a frame element, with the frame elements possibly being provided with web structures via which they can in particular be connected to one another for forming a condensation/evaporation stage. Each frame element may comprise an inner region which is surrounded by an outer frame and which is possibly provided with an in particular grid-like spacer on whose two sides in particular a respective functional surface, for example, a film or a membrane, is applied for forming a respective steam space, a respective heating liquid space or a respective cooling liquid space.

Finally, the present disclosure may relate to a multistage membrane distillation apparatus, comprising: a plurality of multistage membrane distillation modules, the modules being configured to be flowed through in parallel by a liquid to be concentrated, wherein: each module comprises a plurality of serial condensation/evaporation stages configured to be flowed through in series by the liquid to be concentrated, each condensation/evaporation stage comprises a plurality of parallel condensation/evaporation elements configured to be flowed through in parallel by the liquid to be concentrated, and each condensation/evaporation element comprises at least one condensation unit and at least one evaporation unit, wherein each module is formed by a single stack of frame elements.

Accordingly, each module may be arranged as a single stack. Consequently, the heating steam (e.g. generated by a centralized heating stage) can be easily supplied to each module. The heating steam may namely be supplied only to the first frame element of the module stack (and hence to the parallel condensation units of the first stage of the module stack). The same applies to the steam generated in the last stage which may be supplied e.g. to a centralized condensation stage. The overall structure of the apparatus can thus be simplified and made more compact, which can enhance its efficiency, in particular with regard to the energy consumption.

The present disclosure may further relate to a membrane distillation apparatus for producing water for injection, comprising at least one membrane distillation module, the module being configured to be flowed through by a liquid to be concentrated, wherein the module comprises at least one condensation/evaporation stage, the condensation/evaporation stage comprises at least one condensation/evaporation element, and the condensation/evaporation element comprises at least one condensation unit and at least one evaporation unit.

The apparatus further comprises a heating stage configured to generate steam and to provide the steam to the at least one condensation/evaporation stage of the at least one module, and a droplet elimination device comprising a membrane configured to separate droplets from the steam generated by the heating stage.

By providing such an apparatus, it becomes possible to reliably separate any droplets from the steam and hence to avoid a contamination of the final product (i.e. the distillate).

Due to the use of a membrane any potential droplet sweep caused by the steam flow (as it might be possible when using instead of the membrane a grid or mesh) can be reliably avoided.

Furthermore, since the condensation/evaporation stage is heated by steam (and not by hot or boiling water), the steam may already have an equal (e.g. reduced) pressure level like in the condensation/evaporation stage. Accordingly, the membrane may have on both sides equal pressure. Accordingly, there is a reduced risk that said membrane may be damaged due to any pressure differences. Hence, a reliable production of non-contaminated water for injection can be guaranteed. Moreover, the apparatus can be simplified with regard to any pressure control.

The heating stage may be connected to the condensation/evaporation stage via a steam channel for providing the steam to the condensation/evaporation stage.

The droplet elimination device may be arranged in said steam channel such that droplets in the steam are separated from the steam by the membrane.

Since the droplet elimination device may be arranged within said steam channel, there is essentially no pressure difference between both membrane sides (due to the circumstance that there is steam on both sides).

The droplet elimination device may be integrated into the heating stage or into the module, or arranged between and externally to the heating stage and the module.

The membrane may be a steam-permeable, liquid-tight membrane wall.

The membrane may be arranged vertically in the droplet elimination device, in particular when the droplet elimination device (320) is installed in the membrane distillation apparatus. In other words, the membrane is arranged vertical in relation to gravity.

Accordingly, any separated droplets may flow down the vertical membrane due to the gravity. Also another orientation of the membrane is possible, as long as the any separated droplets may flow down the membrane due to the gravity.

The droplet elimination device may comprise a steam chamber separated by the membrane into steam incoming chamber and a steam outgoing chamber.

The steam incoming chamber may be supplied with steam generated by the heating stage via a steam incoming channel and the steam outgoing chamber may provide the steam separated from droplets to the condensation/evaporation stage via a steam outgoing channel.

At least the steam outgoing channel, in particular each of the steam incoming channel and the steam outgoing channel, is arranged above the membrane. The spatial relationship "above" relates desirably to the positioning in the droplet elimination device when the droplet elimination is installed in the membrane distillation apparatus.

Accordingly, a separation of any droplets may be achieved by using the gravitational force on the droplets. Since the at least one steam outgoing channel may be arranged above the membrane, the droplets cannot enter the outgoing channel, even if the membrane is damaged.

The membrane may comprise a steam-permeable, liquid-tight membrane wall section and a steam- and liquid-tight wall section.

The steam- and liquid-tight wall section may be arranged above the steam-permeable, liquid-tight membrane wall section and may cover at least a cross section such that a straight trajectory from the steam incoming channel to the steam outgoing channel is blocked.

Accordingly, due to the steam- and liquid-tight wall section a droplet can be hindered from directly passing from the steam incoming channel to the steam outgoing channel. Further, since the at least one steam outgoing channel may be additionally arranged above the membrane, the droplets cannot enter the outgoing channel, even if the membrane is damaged.

The membrane may have a greater surface area than the cross section area of a steam channel through which the steam passes.

For example, the membrane may have a folded form. Desirably, the membrane may have a folded form when seen from a top view.

Accordingly, due to the increased surface a flow speed of the steam can be reduced, as the flow speed depends on the flow volume per surface size. Hence, since the pressure loss caused by the membrane correlates with the flow speed of the steam, a pressure loss can be reduced due to the decreased flow speed. Furthermore, due to the folded form, the droplet elimination device may have a compact form.

The membrane distillation apparatus may comprise a plurality of multistage membrane distillation modules, the modules being configured to be flowed through in parallel by a liquid to be concentrated, and/or each module may comprise a plurality of serial condensation/evaporation stages configured to be flowed through in series by the liquid to be concentrated, and/or each condensation/evaporation stage may comprise a plurality of parallel condensation/evaporation elements configured to be flowed through in parallel by the liquid to be concentrated.

The membrane distillation apparatus may comprise at least one of:
a centralized heating stage configured to generate steam and to provide the steam to each of the modules in parallel, and
a centralized condensation stage configured to receive steam from each of the modules in parallel and to condense the steam.

The centralized heating stage may be configured as a vapor-liquid separator, in particular as a demister, and/or the centralized heating stage may comprise a heating device and an evaporation device, wherein the heating device may comprise a heating liquid space configured to heat a liquid and to supply it to the evaporation device.

The droplet elimination device may be integrated into the evaporation device by providing a steam-permeable, liquid-tight membrane wall limiting a steam space such that the steam arising from the liquid moves through the membrane wall into the plurality of multistage membrane distillation modules via a plurality of parallel steam passages.

Each of the condensation units may comprise a first steam space at least partly limited by a condensation wall, in particular a film.

Each of the respective evaporation units may comprise a second steam space at least partly limited by a steam-permeable, liquid tight membrane wall.

At least one flow channel for the liquid to be concentrated may be provided between a condensation unit and an adjacent evaporation unit such that the liquid inside the flow channel is heated via the condensation wall and the steam arising from the liquid to be concentrated moves through the membrane wall into the second steam space.

In each condensation/evaporation stage the evaporation units and condensation units may be arranged, in particular stacked, alternately.

The evaporation units may have steam outlet passages connected with another, in particular facing one another and/or being aligned with each other.

The condensation units m ay have steam inlet passages connected with another, in particular facing one another.

The steam inlet passages and the steam outlet passages may be arranged above the at least one flow channel and the steam outlet passages.

When the droplet elimination device is integrated into the at least one module, the steam incoming channel and the steam outgoing channel may be arranged to be aligned with the steam inlet passages and the steam outlet passages.

This structure may use standardized elements, e.g. frame elements, for forming the elimination devices, the condensation units, and the evaporation units.

The steam outlet passages of the evaporation units of a preceding stage may be connected to the steam inlet passages of the condensation units of a successive stage for forming a steam channel providing steam from the preceding stage to the successive stage.

Said units may be in particular arranged such that the respective steam outlet passages of the preceding stage and the respective steam inlet passages of the successive stage face one another.

Each module may be formed by a single stack of frame elements providing the serial condensation/evaporation stages.

Each module may comprise a droplet elimination device provided by at least one frame element of the module, in particular by the first frame module in liquid flow direction.

In this way the droplet elimination device may be easily integrated into the module by simply adding at least one further frame element forming the droplet elimination device.

It is intended that combinations of the above-described elements and those within the specification may be made, except where otherwise contradictory.

It is to be understood that both the foregoing general description and the following detailed description are exemplary and explanatory only and are not restrictive of the disclosure, as claimed.

The accompanying drawings, which are incorporated in and constitute a part of this specification, illustrate embodiments of the disclosure and together with the description, and serve to explain the principles thereof.

BRIEF DESCRIPTION OF THE DRAWINGS

FIG. 5A shows a schematic representation of a first frame element in particular with liquid passages according to embodiments of the present disclosure;

FIG. 5B shows a cross section of the first frame element of FIG. 5A along the line B-B;

FIG. 5C shows a cross section of the first frame element of FIG. 5A along the line C-C;

FIG. 6 shows a schematic representation of a second frame element in particular with liquid passages according to embodiments of the present disclosure;

DESCRIPTION OF THE EMBODIMENTS

Reference will now be made in detail to exemplary embodiments of the disclosure, examples of which are illustrated in the accompanying drawings. Wherever possible, the same reference numbers will be used throughout the drawings to refer to the same or like parts.

Figure 11:
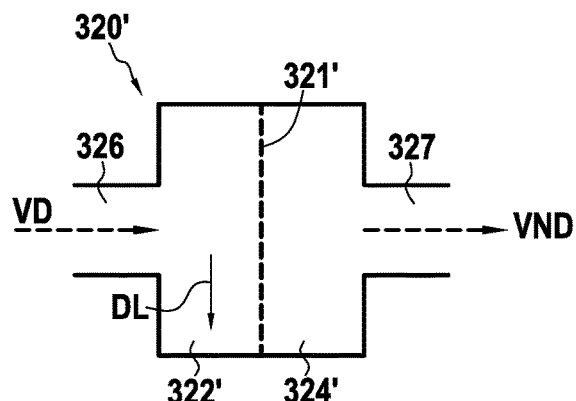
FIG. 11 shows a schematic representation of a droplet elimination device according to a first embodiment of the present disclosure.
Figure 12A:
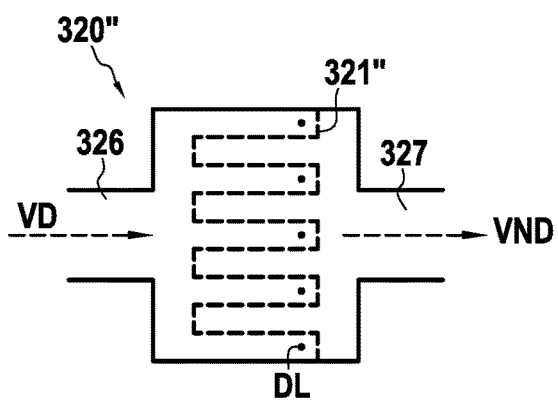
FIG. 12A shows a top view of a schematic representation of a droplet elimination device according to a second embodiment of the present disclosure.
Figure 12B:
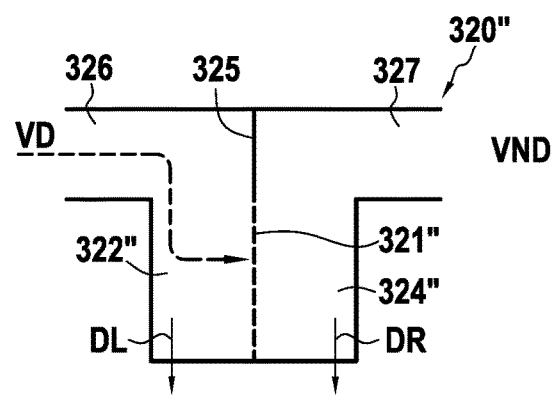
FIG. 12B shows a side view of the droplet elimination device of FIG. 12A.
Figure 13:
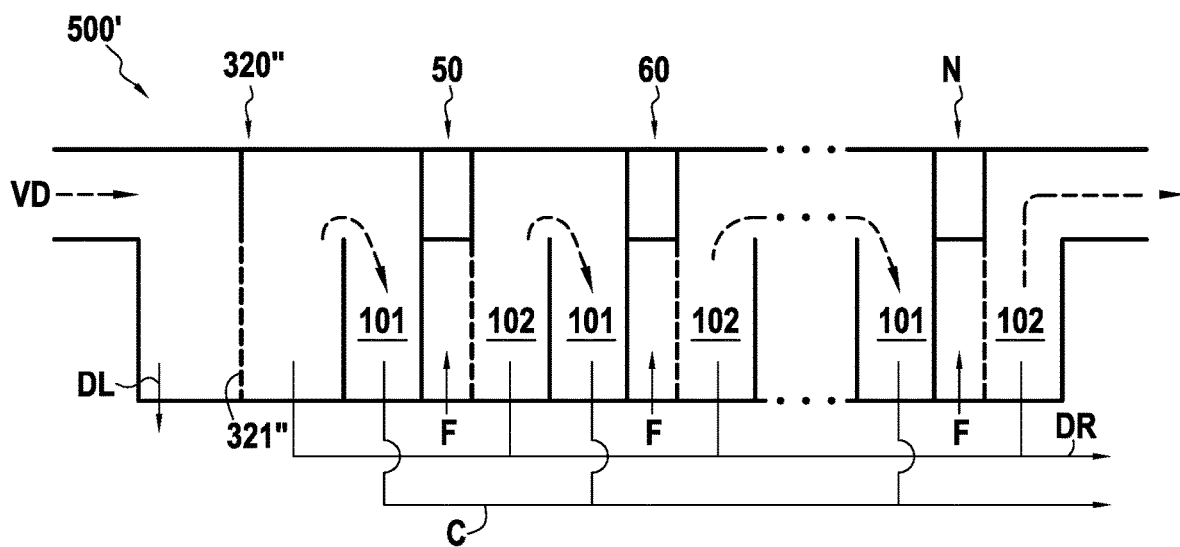
FIG. 13 shows a side view of a schematic representation of a module comprising an integrated droplet elimination device according to embodiments of the present disclosure.

The present disclosure is shown in particular e.g. in FIGS. 11 to 13. However, the features of the frame elements 101, 102 are described first which may form the membrane distillation apparatus.

Figure 1:
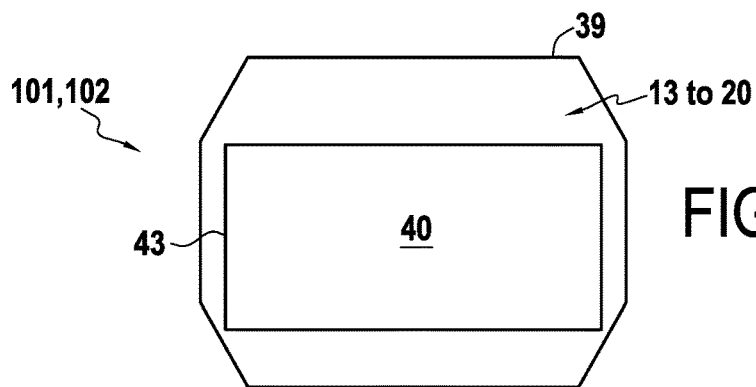
FIG. 1 shows a schematic representation of the principle design of the frame elements according to embodiments of the present disclosure.

FIG. 1 shows a schematic representation of the principle design of the frame elements according to embodiments of the present disclosure. The frame element is shown in a front view. The frame elements 101, 102 have an outer frame 39 and an inner frame 43.

Accordingly, the outer frame surrounds the inner frame. The inner frame encases (i.e. borders or defines in its inside) an inner region which desirably is used as an active area of the frame element (as described in more detail in other passages of the present disclosure).

Hence, there remains an available area between the outer frame and the inner frame. In this available area passage openings and vapor and/or liquid channels are arranged.

This configuration leads to a more efficient utilization of the total area inside the frame element, as the complete area between outer and inner frame may be utilized for passage openings and channels. For example, the vapor and/or liquid channels can have an increased size, which can lead to a higher possible output and efficiency of the modular flow system, as described in other passages of the present disclosure.

The inner frame 43 may comprise a rectangular form. The outer frame may comprise a octagonal form, more desirably an octagonal form. In other words, the frame element may have a octagonal shape. Accordingly, the form of the outer frame may approximate a circular form, when having a octagonal form. Therefore, the pressure inside the frame element can be balanced (equalized), which can reduce the maximum pressure and hence allows thinner walls and increased openings, channels and inner region.

The frame elements 101, 102 may be made of a plastic, i.e. a synthetic material.

Figure 2:
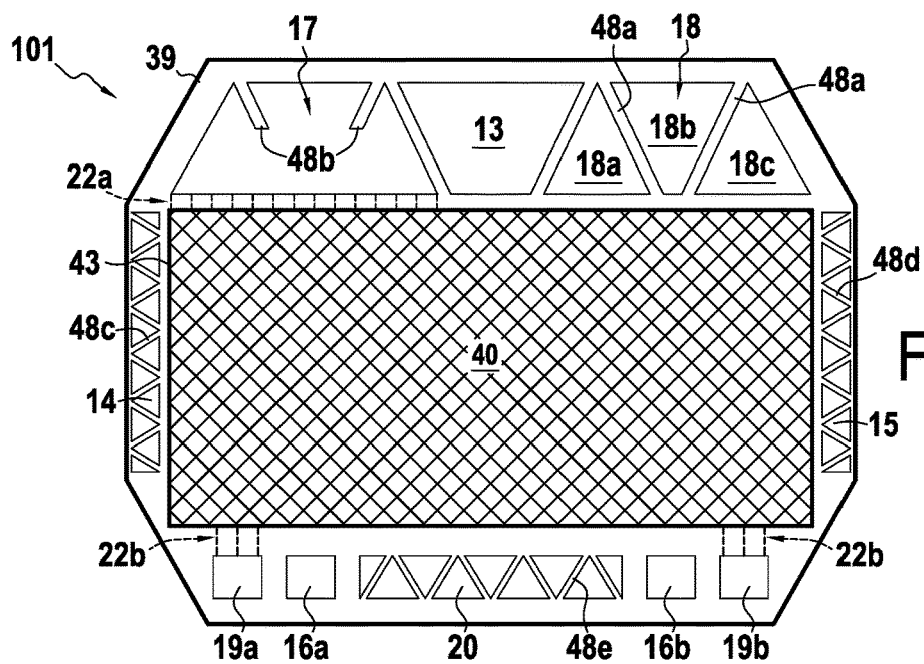
FIG. 2 shows a schematic representation of a first frame element in particular with vapor and/or liquid channels according to embodiments of the present disclosure.

FIG. 2 shows a schematic representation of a first frame element 101 in particular with vapor and/or liquid channels according to embodiments of the present disclosure.

The frame element 101 is shown in a front view in the orientation it has when being stacked in a modular flow system. Accordingly, vapor and/or liquid channels 17, 18 are arranged above the inner region 40 in the modular flow system (i.e. desirably with regard to the gravitational direction pointing downwards).

Desirably the vapor and/or liquid channels have a trapezoidal form. In this case they can efficiently fill the area above the (desirably rectangular) inner region in a frame element having a octagonal form. Thus, the vapor and/or liquid channels can efficiently use the space in the frame element above the inner region 40. Consequently the frame element can have an outer shape which converges toward a circle form (e.g. by having the form of a octagon). In a circle form the pressure inside the frame element is ideally balanced. Therefore, the frame configuration of the present disclosure allows a reduced material use (i.e. thinner walls), as the maximum pressure in the frame element can be reduced compared to e.g. an elongated frame element form. As a further consequence, due to the material reduction the relative size of the inner region, the channels and passage opening can be increased, which can ameliorate the efficiency of the modular flow system.

The cross-sectional area ratio of at least one of the vapor and/or liquid channels 17, 18 of a frame element 101, 102 with regard to the central inner region 40 may be at least 13%, more desirably 15%. In other words, the cross-sectional area ratio of the entirety of vapor and/or liquid channels 17, 18 with regard to the central inner region 40 may be at least 26%, more desirably 30%. It is noted that the schematic figures do not necessarily represent these dimensions correctly.

Accordingly, the relative sizes of the vapor and/or liquid channels may be increased in comparison to the systems of the prior art. This is possible due to the new arrangement of the channels above the inner regions, which can allow a more balanced pressure inside the frame element and hence a decreased maximum pressure. In particular, the inventors have found that the defined relative sizes lead to an optimum efficiency of the complete modular flow system. Indeed, a relative increase of the sizes of the vapor and/or liquid channels 17, 18 also implies a reduction of the active area (40, 40') of the membrane frame. However, due to the increased sizes of the vapor and/or liquid channels, more vapor can be transported to and from the active areas (i.e. the condensation/evaporation areas). Hence, the modular flow system may contain more frame elements in one stage and/or in one module (as described below in more detail), which can increase the efficiency and the output of the flow system. The inventors have found that the described relative sizes lead to an optimum size balance leading to improved total efficiency of the modular flow system.

The inner region 40 is desirably bordered (i.e. covered) on its front and back side by a film, foil, or other heat transmitting but gas and liquid tight material. In particular, the central inner region 40 may be hollow or comprises a grid-like spacer. The film may be arranged, in particular welded, on the two sides of the spacer. The film may cover the total spacer but the passage openings and the channels may be kept free.

There is provided a vapor and/or liquid channel opening 22a between the vapor and/or liquid channel 17 and the inner region 40. Said vapor and/or liquid channel opening 22a may be e.g. a through hole inside an upper first frame wall of the inner frame 43. Said frame wall may hence separate the inner region 40 from the vapor and/or liquid channels 17, 18. Accordingly, vapor may be transported via a vapor and/or liquid channel 17 and the vapor and/or liquid channel opening 22a from or to the inner region 40.

Further, condensate collection passages 19a, 19b are arranged below the inner region 40. The central inner region may further be connected to at least one of the condensate collection passages by a condensate channel opening (or openings) 22b constituting a through hole in the inner frame. The condensed vapor generated inside said inner region when the vapor cools down may thus run out through the condensation collection passage.

Figure 3:
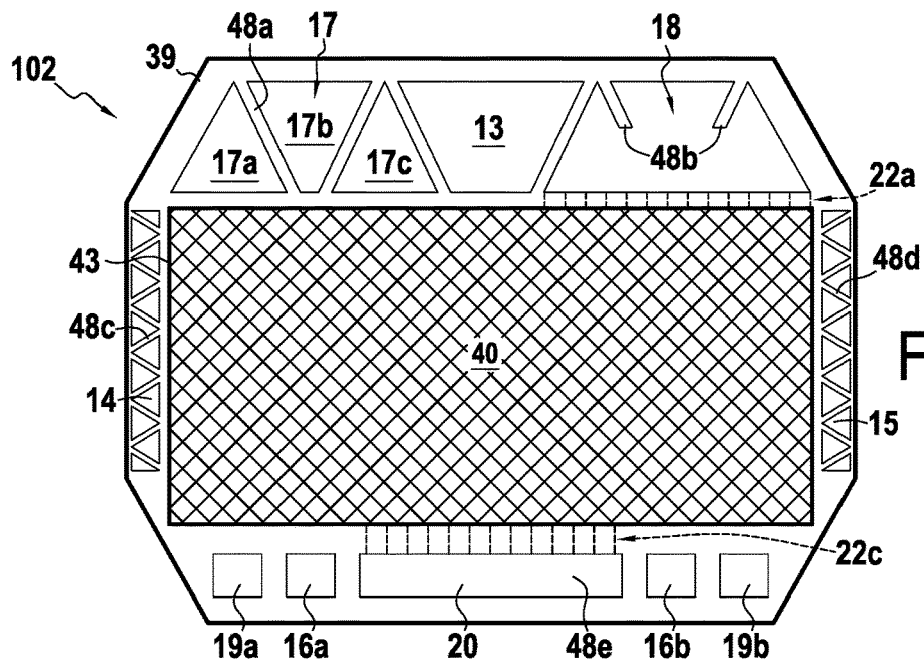
FIG. 3 shows a schematic representation of a second frame element in particular with vapor and/or liquid channels according to embodiments of the present disclosure.

On the left and or right side of the inner region at least one passage opening 14, 15 may be provided for other functions of the modular flow system than a membrane distillation stage (as e.g. formed by the exemplary first and second frame elements shown in FIGS. 2 and 3).

Below the inner region 40 and between the condensate collection passages 19a, 19b there may be arranged first passage openings 16a, 16b which are described in more detail in context of FIG. 5A.

Further, below the inner region 40 and between the first passage openings 16a, 16b there may be arranged a central drain passage which is described in more detail in context of FIG. 4C.

FIG. 3 shows a schematic representation of a second frame element in particular with vapor and/or liquid channels according to embodiments of the present disclosure.

The frame element 102 is desirably again shown in a front view in the orientation it has in when being stacked in a modular flow system, i.e. in the same view as frame 101 of FIG. 2. The second frame element 102 may be to adjacent to the first frame element 101 in the modular flow system. Accordingly, the first and second frame element may be stacked. More desirably, a plurality of first frame elements

Figure 8:
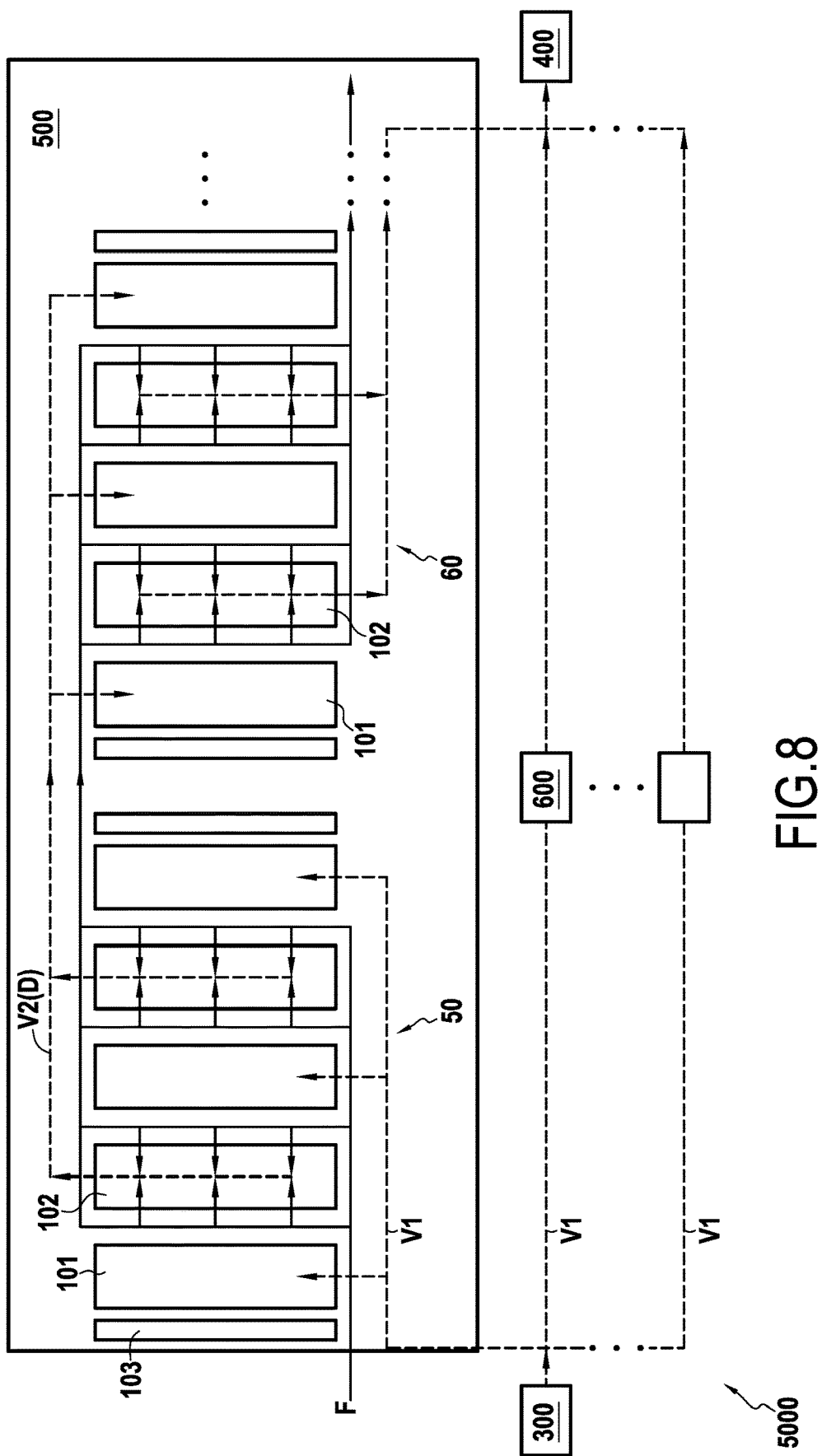
FIG. 8 shows a schematic representation of a multistage membrane distillation apparatus, in particular comprising a modular flow system, according to embodiments of the present disclosure.

101 and a plurality of second frame elements 102 may be stacked alternately, as it is shown e.g. in FIG. 8.

The second frame element 102 principally corresponds to the first frame element 101. However, the inner region 40 of second frame element 102 is desirably bordered (i.e. covered) on its front and back side by a vapor-permeable (and liquid tight) membrane. Thus, the border may serve to transmit vapor and block liquid (i.e. the feed).

Beside this, it might be possible that the second frame element 102 corresponds to the first frame element and is merely turned in FIG. 3 around a vertical symmetry axis. However, it is desired that the first and second frame elements comprise further structural differences, at least regarding the configuration of the liquid passages 45, 46 (as shown in FIGS. 5 and 6).

As a further desired difference of the second frame element with regard to the first frame element, instead of the condensate channel openings 22*b* the frame element 102 comprises a drain channel opening (or openings) 22*c* constituting a through hole in the inner frame (i.e. a second frame wall below the inner region 40) connecting the central inner region 40 to the drain passage 20.

As further shown in FIGS. 2 and 3, at least one of the vapor and/or liquid channels 17, 18 comprises at least one internal strut member 48*a*, 48*b* extending between the inner frame 43 and the outer frame 39. Hence, the structure of the frame element 101 is reinforced by the at least one internal strut member. Hence, the size of the vapor and/or liquid channels may be increased without decreasing the steadiness (stability) of the frame element.

In particular, the strut members may be provided to connect the outer frame with the inner frame, which can lead to a higher stability. Accordingly, the frame walls may be made thinner.

The at least one strut member may comprise at least one connecting internal strut member 48*a* connecting the inner frame 43 with the outer frame 39, and/or at least one non-connecting internal strut member 48*b* protruding from the inner frame 43 toward the outer frame 39 or from the outer frame 39 toward the inner frame 43 without connecting the inner frame 43 with the outer frame 39.

In the present example of e.g. FIG. 2 the channel 17 comprises two non-connecting internal strut members 48*b* and the channel 18 comprises two connecting internal strut members 48*a*. In the present example of e.g. FIG. 3 the channel 17 comprises two connecting internal strut member 48*a* and the channel 18 comprises two non-connecting internal strut members 48*b*.

When the frame elements 101, 102 are stacked alternately, the connecting and non-connecting internal strut members are desirably also stacked alternately.

Accordingly, due to a possible use of connecting internal strut members, the stability of the frame element can be effectively increased. Further, due to a possible use of non-connecting internal strut members, the liquid or vapor inside the channel can still pass from one side of the internal strut member to the other. Hence, pressure differences can be equalized (balanced). Thus, the channel may also be regarded as one functional channel in spite of the (connecting) internal strut member separating it in at least two sub channels (which may be arranged at adjacent frame elements in the stack).

Finally, since frame elements may be stacked such that connecting internal strut members and non-connecting internal strut members are arranged alternately in a vapor and/or liquid channel (17, 18), the overall stability of the modular flow system, provided by the structure forming said vapor and/or liquid channel (17, 18) can be increased.

Figure 7:
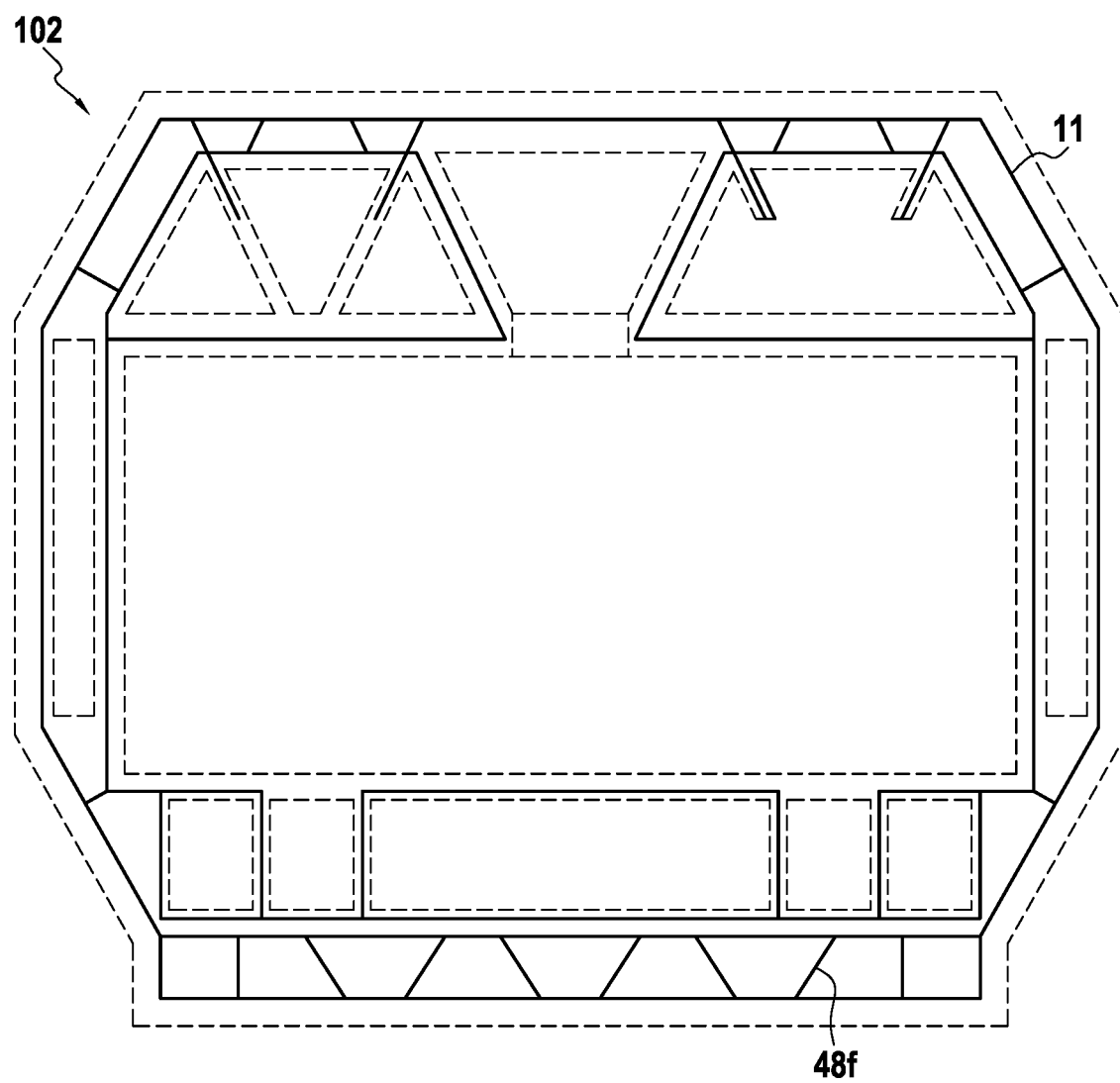
FIG. 7 shows a schematic representation of a second frame element in particular with a welding web structure according to embodiments of the present disclosure.

Desirably the internal strut members 48 may be provided at least partially with the welding web structure 11 (cf. FIG. 7). The welding web structure is used to attach the frame elements to each other, in particular to close any channels, where necessary and to increase the all over stability of the modular flow system.

In particular, when the adjacent first and second frame elements 101, 102 are stacked, a welding web structure 11 of the connecting internal strut members 48*a* are aligned and match with the welding web structure of the non-connecting internal strut members 48*b*. For example, the welding web structure extends across the complete non-connecting internal strut members 48*b* and only on a matching section on the connecting internal strut members 48*a* (as shown e.g. in FIG. 7). Thus, a reliable connection across the complete stack of frame elements can be obtained in the area of the non-connecting internal strut members 48*b*, which can provide an increased stiffness of the modular flow system. At the same time a vapor inside the channels 17, 18 can still be equalized within the channel due to the open sections in each second frame element.

Due to the connecting internal strut members 48*a* (e.g. in FIG. 2) the channel 18 may be regarded as comprising three adjacent sub-channels 18*a*, 18*b*, 18*c* which, when the frame elements are stacked together, traverse across the frame elements. These sub channels have openings between each other in some of the frame elements (e.g. in an adjacent frame element 102 as shown in FIG. 3). Accordingly, due to the openings between the sub channels, the liquid or vapor inside the channel can still pass from one side of the internal strut member to the other. Hence, pressure differences can be equalized (balanced). Thus, the channel may also be regarded as one functional channel in spite of the plurality of comprised sub channels.

Only some of the sub-channels (e.g. sub-channels 18*a* and 18*c* of the first frame element 101) may be connected to the central inner region (40) (e.g. via a vapor and/or liquid channel opening (22) of an adjacent second frame element of the stack). It is noted that this feature is not illustrated in the schematic FIGS. 2 and 3.

Furthermore, in order to further strengthen the stability of the frame element 101, 102, the outer frame 39 may include additional outer strut members 48*c*, 48*d*, 48*e*, 48*f* (48*f* is shown in FIG. 7).

Moreover, the inner frame 43 and the outer frame 39 may be connected by additional intermediate strut members (e.g. a strut member separating a vapor and/or liquid channels 17, 18 and the first passage opening 13.

Figure 4A:
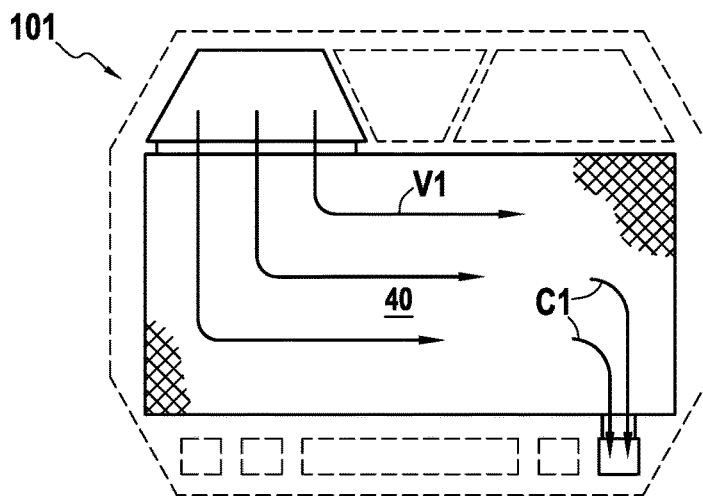
FIG. 4A shows a schematic representation of the vapor and liquid flow in a first frame element according to embodiments of the present disclosure.
Figure 4B:
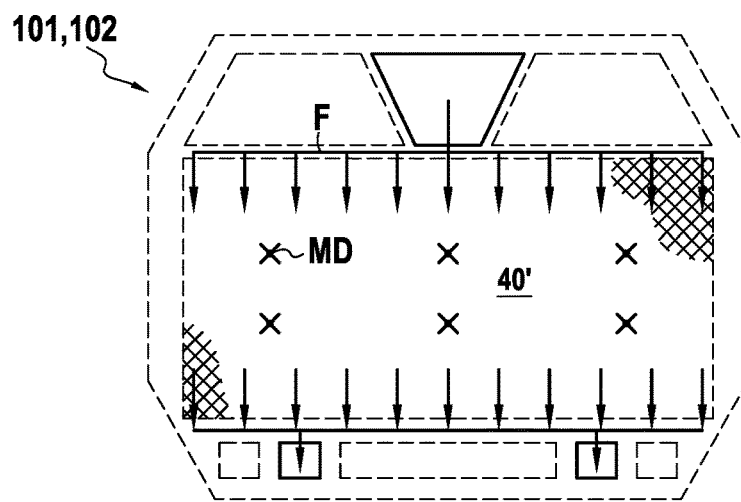
FIG. 4B shows a schematic representation of the feed flow in between a first and a second frame element according to embodiments of the present disclosure.
Figure 4C:
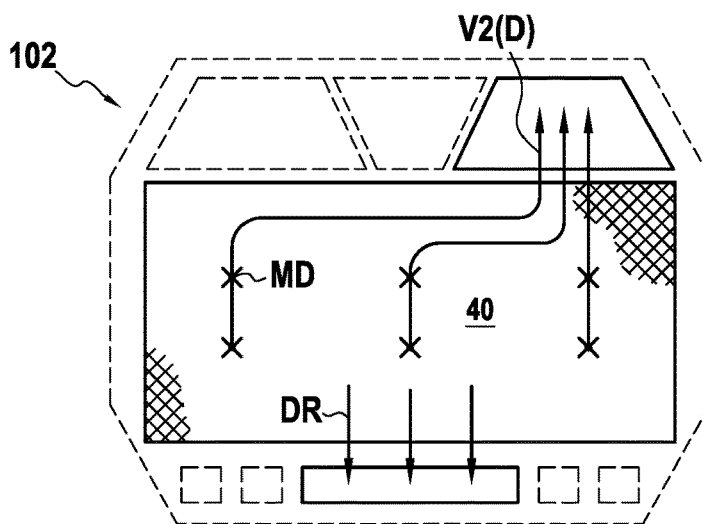
FIG. 4C shows a schematic representation of the vapor and liquid flow in a second frame element adjacent to the first frame element according to embodiments of the present disclosure.

In FIG. 4A to 4C the process of a membrane distillation using adjacent stacked frame elements 101 and 102 is shown. Generally, the inner region 40 (and desirably also the feeding area in front of the inner region in a front view of the frame element) may serve as the active area, in particular for membrane distillation. Said inner region and the feeding area may namely either be separated by a film, foil, or other heat transmitting and gas and liquid tight material, or by a vapor-permeable membrane. Hence, in case a film or there like is used, the border between inner region and feeding area may serve for heat transfer. In case a membrane is used, the border may serve to transmit vapor and block liquid (i.e. the feed).

FIG. 4A shows a schematic representation of the vapor and liquid flow in a first frame element 101 according to embodiments of the present disclosure. Vapor V1 is supplied by the first vapor and/or liquid channel and enters into the inner region 40 of the first frame element 101. Since this inner region 40 is bordered on its front and back side by a film, the vapor cannot pass the film (i.e. in a direction perpendicular to the frame element. Instead, the vapor condenses at the foil, such that a condensate (liquid) C1 runs out of the inner region into one or several condensate collection passages (19*a* and/or *b*). However, the heat of the vapor is transferred by the film to its opposite side, when the vapor condenses.

FIG. 4B shows a schematic representation of the feed flow F in between a first frame element 101 and a second frame element 102 according to embodiments of the present disclosure.

The frame elements 101, 102 are configured such (e.g. by the welding web structure(s) in between) that a gap remains between the frame elements when they are stacked in the modular flow system. This gap in particular forms a feeding area 40' being aligned with the inner regions of the stacked frame elements and being in front of and outside of the inner regions 40 of the adjacent frame elements.

Since the inner region 40 of the second frame element 102 is bordered on its front and back side by a vapor-permeable membrane, the feeding area 40' is bordered on a first side by a film (toward the first frame element 101) and on a second side by a vapor-permeable membrane (toward the second frame element 102).

A feed F is supplied via the first passage opening 13 to the feeding area 40'. Said feed may be a liquid, e.g. salt water or dirt water which is distilled and/or cleaned by the modular flow system. The feed may have a temperature slightly lower than the vapor V1, e.g. a difference of 4 to 6° C.

Due to the heat transferred from the condensing vapor V1, the feed F is heated and vaporizes. In this regard it is possible that the pressure within the feeding area or in parts of the modular flow system is reduced such that the feed boils when heated. The vapor passes the vapor-permeable membrane, which can lead to a membrane distillation MD.

FIG. 4C shows a schematic representation of the vapor and liquid flow in the second frame element 102 adjacent to the first frame element 101 according to embodiments of the present disclosure.

Due to the membrane distillation MD, vapor enters from the feeding area 40' into the inner region 40 of the frame element 102. Said vapor may have a slightly lower temperature than the vapor V1, e.g. 2 to 3° C. and leaves the inner region 40 via the second vapor and/or liquid channel 18.

The arrangement shown in FIG. 4A to 4C shows a first stage of the modular flow system. Said vapor leaving the second frame element 102 may be transmitted to a second stage of the modular flow system where it may be used as (heating) vapor in a first frame element 101 again. Thus, the modular flow system may have several stages (e.g. 10 or more) wherein in each subsequent stage the temperatures of the supplied vapor and feed are slightly decreased with regard to the preceding stage.

As further shown in FIG. 4C, in case any feed undesirably passes the membrane (e.g. due to defects in the membrane) said feed (i.e. leakage) DR can leave the inner region 40 of the second frame element via the drain passage 20. Due to the arrangement of the vapor and/or liquid channel 18 above the inner region 40, the whole inner region 40 may serve as a barrier for leakage. In other words, the leakage would need to fill the complete inner region, in order to pass the barrier given by the configuration of the frame element, i.e. to flow into the vapor and/or liquid channel 18. Hence, any contamination of the final product (i.e. the distillate) can be effectively prevented.

FIG. 5A shows a schematic representation of a first frame element 101 in particular with liquid passages 45*a*, 46*a* according to embodiments of the present disclosure.

The liquid passages 45, 46 are desirably provided (e.g. as notches) on a first upper frame wall and a second lower frame wall of the inner frame 43. The first upper frame wall may separate the vapor and/or liquid channels 17, 18 and the first passage opening 13 from the inner region 40. The second lower frame wall may separate the passages 19, 20 and openings 16 from the inner region 40.

A first liquid passage 45 is provided by the first upper frame wall and is configured to distribute a feed from the first passage opening 13 to the feeding area 40'. The liquid passage 45 may extend asymmetrically by extending from a central section of the first frame side (below the first opening 13) into only one first direction along the first frame side (e.g. in FIG. 5A to the right) without extending into the opposite direction. The first liquid passage 45 may be connected to the first passage opening 13, in particular by connecting notches 47 provided on a front side of the first upper frame wall or a connecting channel provided inside said frame wall.

A second liquid passage 46 is provided by the second lower frame wall and is configured to collect a liquid from the feeding area 40' to the first passage openings 16*a*, 16*b*. The second liquid passage 46 may extend discontinuously by extending only across the central region but not across the peripheral regions of the second lower frame wall. The second liquid passage 46 may be connected to the second passage openings 16*a*, 16*b*, in particular by a connecting notches 47 provided on a front side of the second lower frame wall or a connecting channel provided inside the second lower frame wall.

FIG. 5B shows a cross section of the first frame element of FIG. 5A along the line B-B. It is noted that FIG. 5B only shows the front side structure of the frame element 101 but does not consider its structure on the back side (as it is shown e.g. in FIG. 5C). Said back side structure may be symmetrical to the shown front side structure.

FIG. 5C shows a cross section of the first frame element of FIG. 5A along the line C-C. FIG. 5C schematically shows the structure of the frame element 101 on its front side and on its back side. As it can be seen, the front and back side of the frame elements can correspond to each other, desirable they are symmetric in a top view of the frame elements (which corresponds to the direction of view in FIG. 5B). In other words a frame element may be symmetric to a center plane of the frame element which is parallel to a plane defined by the front or back side of the frame element.

As it is shown in 5C, a feed supplied by the first opening 13 can enter the notch 45*a* via the connecting notch 47. Due to a barrier on the lower side of the notch (shown in FIG. 5C) which actually forms one side wall of the notch (or cavity) 45*a*, the feed is first fills the notch before it enters the (relatively thin) feeding area 40' by passing the barrier.

FIG. 6 shows a schematic representation of a second frame element 102 in particular with liquid passages 45, 46 according to embodiments of the present disclosure;

As shown, the second frame elements desirably comprises complementary liquid passages 45, 46, such that the liquid passages of stacked first and adjacent second frame elements 101, 102 form together a liquid passage extending across (i.e. over the full length of) the complete first upper and second lower sides the feeding area 40' (regarding peripheral liquid passages 46*b*, this is only schematically shown).

Accordingly, the liquid passage 45 of the second frame element 102 may extend asymmetrically by extending from a central section of the first frame side (below the first opening 13) into only a second direction along the first frame side (e.g. in FIG. 6 to the left) without extending into the opposite first direction.

A second liquid passage 46 of the second frame element 102 may extend discontinuously by extending only across the peripheral regions of the second lower frame wall but not across the central region.

As a consequence, it is possible to provide channel openings 22a, 22b, 22c constituting through holes in the inner frame in those areas where no liquid passage is provided. As a consequence, there is no interference of the liquid passage and the other function. Hence, the thickness of the frame wall (in particular in a front view of the frame member) may be reduced and hence, desirably of the complete frame element. As a consequence, more frame elements may be used in a modular flow system and the heat transfer may be increased due to the reduced thickness. This leads to a higher efficiency and an increased output of the flow system.

FIG. 7 shows a schematic representation of a second frame element in particular with a welding web structure 11 according to embodiments of the present disclosure. The first frame element 101 may have a corresponding welding web structure (with respective differences on e.g. the strut members 48a, 48b).

The welding web structure 11 is schematically shown by a solid line in FIG. 7. The other structural elements and features of the frame elements are indicated by dashed lines.

The welding web structure 11 defines regions including the passage openings 13 to 16 and the central inner region 40 and defines at least two regions each including a vapor and/or liquid passage 17, 18. As shown in FIG. 7, the region defining the central region 40 may also include the first passage opening 13 and the second passage openings 16a, 16b. In this way, a feed supplied by the first passage opening 13 can enter the feeding area 40' between two adjacent frame elements and leave the feeding area via the second passage openings 16a, 16b.

The further passage openings 14, 15, channels 17, 18 and passages 20 are each desirably enclosed by a welding web structure 11 such that they are separated from each other in the area between two adjacent frame elements.

As further shown in FIG. 7, the welding web structure desirably extends across the complete non-connecting internal strut members 48b and only on a matching section on the connecting internal strut members 48a. Due to the different arrangement of the non-connecting internal strut members in the first frame element 101, the arrangement of the welding web structure desirably differs correspondingly.

As further shown in FIG. 7, in order to additionally strengthen the stability of the frame element 101, 102, the outer frame 39 may include additional outer strut members 48f. Such outer strut members may be provided with the welding web structure 11. Accordingly, outer strut members may be provided inside the outer frame, e.g. on an additional base element provided at the bottom of the frame element (shown in FIG. 7 but not in FIGS. 1 to 6).

Desirably, said welding web structure 11 is provided on only one side of a frame element (as schematically shown e.g. in FIG. 5C) but it may also be arranged (e.g. symmetrically) on both sides.

FIG. 8 shows a schematic representation of a multistage membrane distillation apparatus, in particular comprising a modular flow system, according to embodiments of the present disclosure.

The multistage membrane distillation apparatus 5000 comprises a plurality of multistage membrane distillation modules 500, 600. The modules are configured to be flowed through in parallel by a liquid (i.e. a feed, e.g. salt or dirt water) F to be concentrated. The modules are also supplied in parallel by a (heating) steam V1, as described below.

Each module comprises a plurality of serial condensation/evaporation stages 50, 60 etc. configured to be flowed through in series by the liquid to be concentrated. This is shown in FIG. 8 for module 500 only. Further stages may be subsequently connected in series to stage 60.

A steam (i.e. vapor) V2 generated in a first stage 50 may be supplied to a subsequent second stage 60 to heat said second stage. In this way the stages are also (at least functionally) connected (or coupled) in series with regard to the steam V1, V2. The steam supplied to the first stage (by the centralized heating stage 300) may have a temperature of 80-85° C. The temperature difference between an incoming and a generated outgoing steam in a stage (i.e. V1 and V2) may be 4-5° C. Accordingly, in case the steam supplied to the last stage has 40-45° C., it is possible that a module comprises 8 to 10 stages.

Each condensation/evaporation stage 50, 60 etc. comprises a plurality of parallel condensation/evaporation elements 101, 102 configured to be flowed through in parallel by the liquid to be concentrated. Desirably the condensation/evaporation elements 101, 102 are also configured to be flowed through in parallel by the steam. This is schematically shown in FIG. 8 for condensation/evaporation stage 50, 60.

Each condensation/evaporation element comprises at least one condensation unit 101 (e.g. a first frame element 101) and at least one evaporation unit 102 (e.g. a second frame element 102), as shown in stages 50 and 60. In the example of FIG. 8 two condensation/evaporation elements are shown which are formed each by an evaporation unit 102 sandwiched by two condensation units 101. Accordingly, the condensation/evaporation elements share a condensation unit 101 arranged between them.

It is noted that a stage may comprise a hundred parallel condensation/evaporation elements or more, i.e. more than hundred condensation units 101 (e.g. first frame elements 101) and evaporation units 102 (e.g. second frame elements 102).

Accordingly, the apparatus may be or comprise at least one modular flow system according to the present disclosure. Also each module 500, 600 may be a modular flow system according to the present disclosure.

A stage 50, 60 may be terminated on its both ends by covers (i.e. closing frame members) 103, which close at least some of the openings, channels, passages, etc. in the outmost frame members 101, 102 (in FIG. 8 frame members 101).

The multistage membrane distillation apparatus 5000 has thus a hierarchical organization with three levels. On the first highest lever, the apparatus comprises a plurality of parallel multistage membrane distillation modules 500, 600. On the second (lower) level, the apparatus comprises a plurality of serial condensation/evaporation stage 50, 60. On the third (lowest) level, the apparatus comprises a plurality of parallel condensation/evaporation elements 101, 102. A condensation/evaporation element may comprise a first frame element 101 and a second frame element 102.

Due to this arrangement the apparatus may comprise up to several thousand condensation/evaporation elements, e.g. by simply combining several thousand first and second frame elements, respectively.

The apparatus 5000 may further comprise a centralized heating stage 300 configured to generate steam (i.e. a vapor) and to provide the steam to each of the modules in parallel, and/or a centralized condensation stage 400 configured to receive steam from each of the modules in parallel and to condense the steam.

Furthermore, by providing such an apparatus, it is possible that several modules commonly use a centralized (or single) heating stage and/or a centralized (or single) condensation stage. Therefore, the energy consumption of the centralized (or single) heating stage and/or a centralized (or single) condensation stage may be shared by a plurality of parallel modules, which can lead to an optimized energy efficiency of the apparatus and at the same time (due to the use of more than one module) to a higher total output of the apparatus.

The centralized heating stage 300 generates steam (i.e. a vapor) and provides the steam to each of the modules in parallel. Accordingly the modules are heated with the supplied steam. In comparison to heating with supplied (hot) liquid, this has the advantage that due to the thermodynamics steam will automatically be attracted most by the coldest surface in a steam space (in the present case the steam channel from the heating stage 300 to the condensation units 101 of each module's first stage). Hence, a module which is colder than the others will automatically be heated more. As a consequence, the temperature of the modules is automatically balanced.

In comparison, heating with (hot) liquid may involve a very precise control implying high effort and reduced reliability.

The same applies to a centralized condensation stage 400. Due to thermodynamics the vapor (or steam) generated in the last stage of each module will automatically be attracted by the centralized condensation stage depending on the temperature of the vapor. Hence, a module which generates hotter vapor (or steam) in its last stage will automatically supply more steam to the centralized condensation stage and will therefore, be cooled more than the other (colder) modules. As a consequence, the temperature of the modules is automatically balanced. In other words, the set temperature of the modules can be automatically controlled.

The centralized heating stage 300 may be configured to provide the steam in each module to a first stage 50 of the serial condensation/evaporation stages. Accordingly, the first stage of each module may be heated by the centralized heating stage.

In particular; the steam is provided in each module to the condensation units 101 of the first stage in parallel. Said condensation units of the first stages are thus heated to a first predetermined temperature, e.g. in the range of 80-85° C.

Accordingly, the condensation units of a first stage 50 of each module may be heated by the generated steam. Condensation units of subsequent stages 60 may be heated with the steam (vapor) generated in preceding stages 50. The feed F may be heated to a second temperature which is slightly lower than the temperature of the generated steam, e.g. 4 to 6° C. lower. In this way the steam V1 can heat the feed F in the first stage such that the liquid vaporizes and passes the membrane walls of the evaporation units 102, thereby causing a membrane distillation.

The centralized condensation stage 400 may be configured to receive steam from a last stage of the serial condensation/evaporation stages 50, 60 of each module.

In particular, the centralized condensation stage 400 may be configured to receive steam from the evaporation units 102 (of each last stage) in parallel, in particular for cooling said evaporation units to a third predetermined temperature, e.g. in the range of 30 to 35° C., being lower than the first and the second predetermined temperatures. Accordingly, the evaporation units 102 of a last stage of each module may be cooled by the centralized condensation stage. Evaporation units 102 of preceding stages 50 may be cooled by subsequent stages 60 (i.e. the condensation units 101 of subsequent stages).

Each of the condensation units 101 may comprise a first steam space corresponding to the inner region 40 of the frame element 101 at least partly limited by a condensation wall, in particular a film. Accordingly, a condensation unit may be a first frame element 101, as described above.

Each of the respective evaporation units 102 may comprise a second steam space corresponding to the inner region 40 of the frame element 101 at least partly limited by a steam-permeable, liquid tight membrane wall. Accordingly, a evaporation unit may be a second frame element 102, as described above.

At least one flow channel (formed by a feeding area 40' between adjacent frame elements 101, 102) for the liquid to be concentrated may be provided between a condensation unit 101 and an adjacent evaporation unit 102 such that the liquid inside the flow channel is heated via the condensation wall and the steam arising from the liquid to be concentrated moves through the membrane wall into the second steam space.

It is noted that for simplicity reasons the schematic illustration of FIG. 8 does not show any channels, in which the condensate C can flow out of the condensation units 101 (e.g. via condensate collection passages 19a, 19b). This condensate C may constitute, in particular together with the condensed vapor Vn in the centralized condensation stage 400, the final product of the apparatus (i.e. the distillate). Said final product may be collected in a container (not shown in FIG. 8). Furthermore, FIG. 8 does not show a drainage channel which may be configured to guide the drainage DR of the evaporation units 102 (e.g. via the drain passages 20) to a drainage container or to recirculate it to the feed supply channels which supply the feed F to the apparatus.

In the example of FIG. 8 in each condensation/evaporation stage 50, 60 the evaporation units 102 and condensation units 101 are stacked alternately. The evaporation units 102 have steam outlet passages in form of the vapor and/or liquid channels 18 connected with another, in particular facing one another and/or being aligned with each other. The condensation units 101 have steam inlet passages in the form of the vapor and/or liquid channels 17 connected with another, for example, facing one another.

The evaporation units 102 further comprise passage openings in the form of the vapor and/or liquid channels 17 facing the steam inlet passages 17 of the condensation units 101. The condensation units also comprise passage openings in the form of the vapor and/or liquid channels 18 facing steam outlet passages 18 of the evaporation units 102. Said passage openings are hence vapor and/or liquid channels 17, 18 which are not connected to the inner region by channel openings 22a. In other words, in an evaporation unit 102 the steam outlet passage 18 and the passage opening 17 are be symmetrical, and in an condensation unit 101 the steam inlet passage 17 and the passage opening 18 are symmetrical.

Since the vapor and/or liquid channels, and also the further openings and passages 13 to 16 and 19, 20 match each other in both frame elements 101, 102. Hence, each condensation/evaporation element comprises a single stack of frame elements providing the respective condensation units and evaporation units of the condensation/evaporation element. Furthermore, also each condensation/evaporation stage 50 is formed by a single stack of frame elements providing the parallel condensation/evaporation elements.

By this configuration a set of parallel connected evaporation and condensation units can be obtained in a stage.

Furthermore, as shown in the example of FIG. 8, the steam outlet passages 18 of the evaporation units 102 of a preceding stage 50 may be connected to the steam inlet passages 17 of the condensation units 101 of a successive stage 60 for forming a steam channel providing steam from the preceding stage to the successive stage. Hence, the subsequent stage 60 can be heated by the steam generated in the preceding stage 50. At the same time, said steam is the distillate (e.g. distilled and hence cleaned water).

Said units 101, 102 may be in particular arranged such that the respective steam outlet passages 18 of the preceding stage 50 and the respective steam inlet passages 17 of the successive stage face 60 one another. This is e.g. possible by turning the frame elements of a subsequent stage around their vertical symmetry axis. Therefore, each module can be formed by a single stack of frame elements.

Consequently, the heating steam V1 (e.g. generated by a centralized heating stage) can be easily supplied to each module 500, 600. The heating steam may namely be supplied only to the first frame element (forming a condensation unit 101) of a stacked module 500 (the outset closing frame members 103 may have a respective opening to allow the heating steam to enter the vapor and/or liquid channel 17 of the first frame member 101). In this way, the steam V1 is supplied to the parallel condensation units 101 of the first stage 50 of the module 500. The same applies to the steam generated in the last stage which may be supplied e.g. to a centralized condensation stage 400. The centralized condensation stage may be connected to the vapor and/or liquid channel 18 of the last frame element of the module stack. Said last frame element may e.g. form a condensation unit 101.

Therefore, the overall structure of the apparatus can be simplified and made more compact, which can enhance its efficiency, in particular with regard to the energy consumption.

Figure 9A:
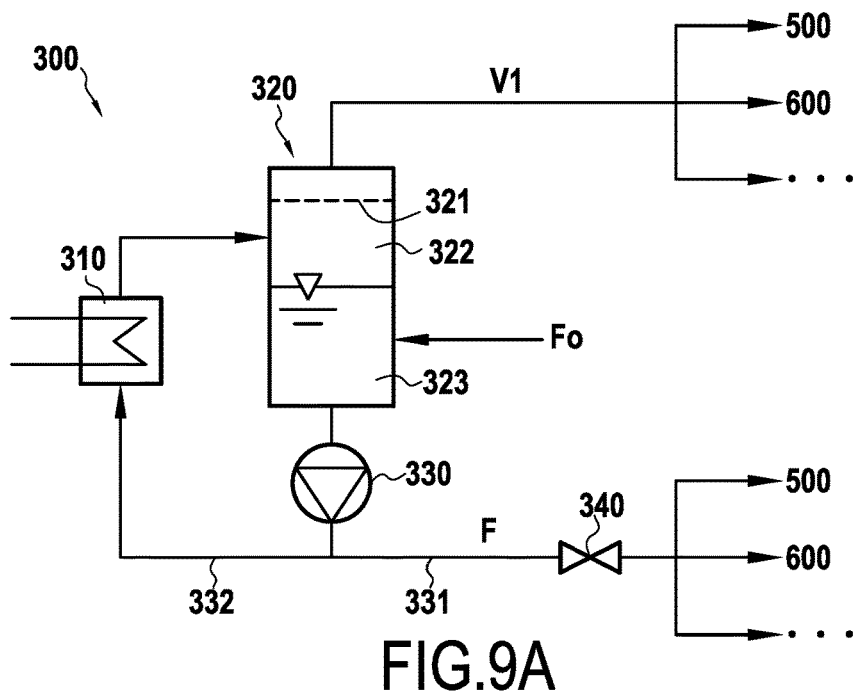
FIG. 9A shows a schematic representation of a centralized heating stage according to a first embodiment of the present disclosure.

FIG. 9A shows a schematic representation of a centralized heating stage 300 according to a first embodiment of the present disclosure. This centralized heating stage 300 may be used e.g. in the multistage membrane distillation apparatus 5000 of FIG. 8.

The centralized heating stage 300 may comprise a heating device 310 and an evaporation device 320, e.g. a flash tank. The heating device 310 may comprise a heating liquid space configured to heat a liquid and to supply it to the evaporation device 320. The evaporation device 320 may comprise a steam space 322 at least partly limited by a mesh tab and/or a steam-permeable, liquid-tight membrane wall 321 such that the steam V1 arising from the liquid moves through the mesh tab and/or the membrane wall into the plurality of multistage membrane distillation modules 500, 600 via a plurality of parallel steam passages.

It is desirable to use a liquid-tight membrane wall such 321. In this way it becomes possible to integrate a droplet elimination device (as described in more detail in context of FIGS. 11 to 13) into the heating stage.

In one exemplary embodiment, the evaporation device 320 may be fed by an unheated liquid (or feed) F0 which is to be concentrated (i.e. to be distilled). In this way the liquid F0 can be heated in the evaporation device, in order to generate the steam V1 and to supply the heated liquid F to the modules 500, 600. The liquid F may in particular be heated to a second predetermined temperature being lower than the first predetermined temperature of the steam V1. For this purpose the evaporation device 320 may be connected to the modules in parallel via a supply channel 331. Additionally, the evaporation device 320 may be connected to the heating device 310 via a return channel 332. The supply channel 331 and the return channel 332 may comprise a common pump 330. The supply channel 331 may further comprise a valve 340 and any further means to adapt the pressure of the liquid F to a desired level.

The centralized heating stage may be configured as a vapor-liquid separator, in particular as a demister.

Figure 9B:
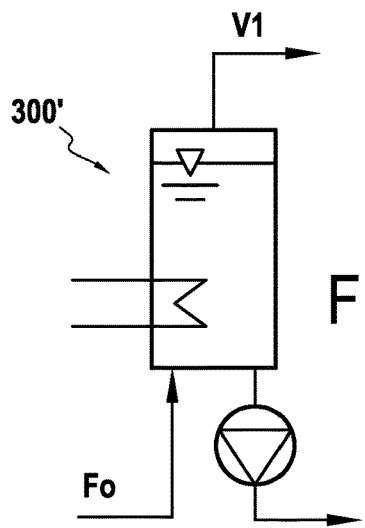
FIG. 9B shows a schematic representation of a centralized heating stage according to a second embodiment of the present disclosure.

FIG. 9B shows a schematic representation of a centralized heating stage according to a second embodiment of the present disclosure. In this example, the centralized heating stage 300' is configured as a kettle-type heating device and/or a submerged tube evaporator.

Figure 9C:
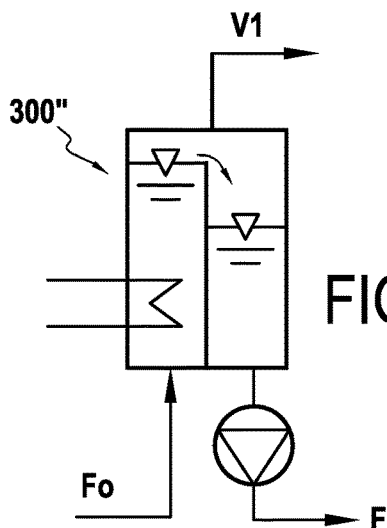
FIG. 9C shows a schematic representation of a centralized heating stage according to a third embodiment of the present disclosure.

FIG. 9C shows a schematic representation of a centralized heating stage according to a third embodiment of the present disclosure. In this example, the centralized heating stage 300" is configured as a thermosiphon heating device and/or as a natural circulation steam boiler.

The centralized heating stage may also have any other configuration for generating steam.

Figure 10:
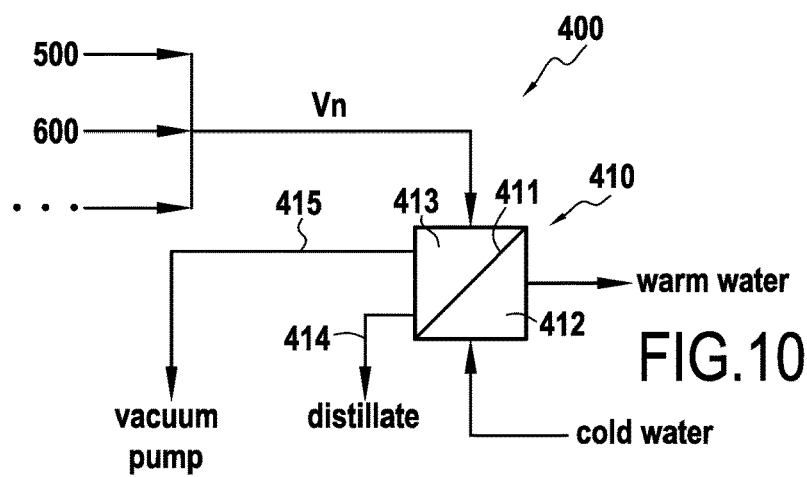
FIG. 10 shows a schematic representation of a centralized condensation stage according to embodiments of the present disclosure.

FIG. 10 shows a schematic representation of a centralized condensation stage 400 according to embodiments of the present disclosure. This centralized condensation stage 400 may be used e.g. in the multistage membrane distillation apparatus 5000 of FIG. 8. The centralized condensation stage 400 may comprise e.g. a mixing condenser or a plate-type condenser.

In one example, the centralized condensation stage 400 may comprise a cooling device 410 with a cooling liquid space 412 and a condensation device with a steam space 413. The cooling liquid space may be supplied with e.g. a cooled water supplied by a flow-through cooler (not shown). The spaces 412, 413 are separated by a liquid-tight, heat-conducting wall 411.

The steam space 413 may be connected to the last stage of each module 500, 600 in parallel via a plurality of respective steam passages. In this way the centralized condensation stage 400 can receive and condensate a vapor Vn generated in the last stages. The condensate, i.e. the distillate leaves the steam space 413 via a distillate channel 414.

Furthermore, the steam space 413 may be connected via a vacuum channel 415 to a vacuum pump. In this way the pressure of the steam space 413 and desirably thus also of the modules may be controlled. E.g. the modules may be applied with a predetermined negative pressure. Due to a pressure reduction the boiling temperature of the liquid is namely reduced, as well, which can enhance the membrane distillation process.

FIG. 11 shows a schematic representation of a droplet elimination device 320' according to a first embodiment of the present disclosure. FIG. 11 may show a side view or a top view of the droplet elimination device.

The droplet elimination device comprises a membrane 321' configured to separate droplets from the steam generated by the heating stage. The membrane comprises in particular a steam-permeable, liquid-tight membrane wall.

The membrane is arranged in a steam chamber which is separated by the membrane into a steam incoming chamber 322' and a steam outgoing chamber 324'.

In particular, the droplet elimination device comprises a steam incoming chamber 322' which is supplied with steam VD (potentially comprising droplets) generated by the heating stage via a steam incoming channel 326. It further comprises a steam outgoing chamber 324' on the other side of the membrane which provides the steam $V_{ND}$ separated from droplets to the condensation/evaporation stages via a steam outgoing channel 327. The steam $V_{ND}$ may be used e.g. as steam V1 in FIG. 8 which is provided to the first stage of each module.

The separated droplets DL can flow down on the membrane in the steam incoming chamber 322' due to the gravitational force (in this case FIG. 11 shows a side view of the droplet elimination device).

The droplet elimination device may be used in a membrane distillation apparatus for producing water for injection. In particular, it may be used in the multi-stage membrane distillation apparatus, as described above, which may hence be used for producing water for injection purposes. For example, the droplet elimination device may be integrated into the heating stage 300 or a respective droplet elimination device may be integrated into each module 500, 600. Alternatively (or additionally), a droplet elimination device may be arranged in a steam channel between and externally to the heating stage and the modules, in particular before the steam channel is split to distribute the steam to each of the modules.

FIG. 12A shows a top view of a schematic representation of a droplet elimination device 320" according to a second embodiment of the present disclosure.

As shown, the membrane has a folded form when seen from said top view. The folds extend hence in a vertical direction. It may however comprise (additional) folds extending in a horizontal direction. Accordingly, due to the increased surface a flow speed of the steam can be reduced, as the flow speed depends on the flow volume per surface size. Hence, since the pressure loss caused by the membrane correlates with the flow speed of the steam, a pressure loss can be reduced due to the decreased flow speed. Furthermore, due to the folded form, the droplet elimination device may have a compact form. Droplets DL may be caught in the folds which extend into the direction of the steam outgoing channel 327 and may there flow down on the membrane.

FIG. 12B shows a side view of the droplet elimination device of FIG. 12A. As shown in this side view, the membrane comprises a steam-permeable, liquid-tight membrane wall section 321" and arranged above a steam- and liquid-tight wall section 325. The membrane may have a folded form like that of FIG. 12A or a straight form like in FIG. 11 (for simplicity, the membrane is schematically illustrated as only one dotted line 321" and not in a folded form)

Furthermore, the steam incoming channel 326 and the steam outgoing channel 327 are arranged above the membrane 321". The spatial relationship "above" relates to the positioning in the droplet elimination device when the droplet elimination is installed in the membrane distillation apparatus.

Accordingly, a separation of any droplets can be achieved by using the gravitational force on the droplets. Since at least the steam outgoing channel is arranged above the membrane, the droplets cannot enter the outgoing channel, even if the membrane is damaged.

In particular, due to the steam- and liquid-tight wall section a droplet can be hindered from directly passing from the steam incoming channel to the steam outgoing channel. Furthermore, even if the membrane is damaged, any droplets passing the membrane (i.e. leakage) cannot enter the outgoing channel 326 due to its positioning above the membrane. Accordingly, the steam outgoing chamber 324" forms a barrier for any leakage DR due to the raised position of the outgoing channel 327.

The steam outgoing chamber 324' may comprise an additional outlet channel on its bottom for any potential leakage.

FIG. 13 shows a side view of a schematic representation of a module comprising an integrated droplet elimination device according to embodiments of the present disclosure.

The module may correspond to the module 500 described above and shown in FIG. 8, wherein it additionally comprises an integrated droplet elimination device. The module comprises a plurality of condensation/evaporation stage 50, 60, N, wherein for each stage for simplicity reasons of the schematic illustration only one condensation/evaporation element is shown in FIG. 13. For each condensation/evaporation element a condensation units 101 and an evaporation unit 102 is schematically shown.

From the condensation units 101 a condensate is extracted (e.g. via collection passages 19a, 19b) which constitutes (together with the condensed vapor Vn generated in the last stage N) the distillate, i.e. the water for injection.

From the evaporation units 102 a leakage may be extracted (e.g. via second passage openings 16a, 16b).

The module further comprises as a first unit (i.e. with regard to the steam flow coming from the heating stage) the droplet elimination device 320". Said droplet elimination device may e.g. be provided by one or two frames added to the stack which forms the module shown in FIG. 8. The steam VD generated by the heating stage 300 passes the droplet elimination device, in particular its membranes 321", whereby any potential droplets are separated from the steam. The purified steam V1 is then transmitted to the first stage 50, in order to heat the condensation units 101.

Accordingly, a compact arrangement of the droplet elimination device 320 can be provided, which has a simple structure due to the use of additional frame elements added to the module stack. Furthermore, since the droplet elimination device has a substantially equal steam pressure on both sides of the membrane 321", there is a reduced risk of any membrane damage, any additional pressure adaptation in the droplet elimination device 320" is unnecessary and the droplet elimination device 320" does not substantially reduce the efficiency of the module. Finally, since the steam incoming channel and the steam outgoing channel are aligned with the steam inlet passages and the steam outlet passages and are arranged above the membrane 321" and the feed areas 40', standardized (frame) elements can be used and a safe leakage barrier is obtained.

Throughout the description, including the claims, the term "comprising a" should be understood as being synonymous with "comprising at least one" unless otherwise stated. In addition, any range set forth in the description, including the claims should be understood as including its end value(s) unless otherwise stated. Specific values for described elements should be understood to be within accepted manufacturing or industry tolerances known to one of skill in the art, and any use of the terms "substantially" and/or "approximately" and/or "generally" should be understood to mean falling within such accepted tolerances.

Although the present disclosure herein has been described with reference to particular embodiments, it is to be understood that these embodiments are merely illustrative of the principles and applications of the present disclosure.

It is intended that the specification and examples be considered as exemplary only, with a true scope of the disclosure being indicated by the following claims.

The invention claimed is:

1. A modular flow system comprising:
a plurality of frame elements configured to be combined together to form a stack for forming a functional member comprising at least one of: a membrane distillation stage, a vapor generator, a condenser, a heat exchanger, a filter or a pervaporation stage,
wherein the frame elements each comprise:
an outer frame and an inner frame, the inner frame encasing a central inner region and being surrounded by the outer frame, and
passage openings and vapor and/or liquid channels arranged between the outer frame and the inner frame,
wherein at least one of the vapor and/or liquid channels comprises at least one internal strut member extending between the inner frame and the outer frame, and
wherein the at least one internal strut member comprises:
at least one non-connecting internal strut member protruding from the inner frame toward the outer frame or from the outer frame toward the inner frame without connecting the inner frame with the outer frame.

2. The modular flow system according to claim 1,
wherein at least one of the vapor and/or liquid channels comprises a plurality of adjacent sub-channels which, when the frame elements are stacked together, traverse across the frame elements and have openings between each other in some of the frame elements, and/or
wherein only some of the sub-channels are connected to the central inner region by a vapor and/or liquid channel opening constituting a through hole in the inner frame.

3. The modular flow system according to claim 1,
wherein the frame elements each comprise:
a drain passage arranged between the outer frame and the inner frame, the drain passage comprising the at least one internal strut member extending between the inner frame and the outer frame.

4. The modular flow system according to claim 1,
wherein the at least one internal strut member is arranged inside the vapor and/or liquid channels, and/or inside a drain passage.

5. The modular flow system according to claim 1,
wherein at least one of: the passage openings, the vapor and/or liquid channels, or a drain passage is bordered on one side by an outer side of the inner frame and on an opposing side by an inner side of the outer frame.

6. The modular flow system according to claim 1,
wherein the at least one internal strut member protrudes from the inner frame toward the outer frame, and/or from the outer frame toward the inner frame,
wherein the at least one internal strut member further comprises:
at least one connecting internal strut member connecting the inner frame with outer frame.

7. The modular flow system according to claim 1,
wherein each of the frame elements comprises two vapor and/or liquid channels axis-symmetrically arranged in the frame element, and
wherein one of the vapor and/or liquid channels comprises at least one connecting internal strut member, and an other one of the vapor and/or liquid channels comprises the at least one non-connecting internal strut member, and
wherein the at least one connecting internal strut member connects the inner frame with outer frame.

8. The modular flow system according to claim 1,
wherein each of the frame elements has a front side and a back side,
wherein the frame elements have a symmetrical configuration such that, when identical first and second frame elements are stacked with facing front sides or facing back sides, the at least one non-connecting internal strut member of a respective first frame element of the identical first and second frame elements is aligned with at least one connecting internal strut member of a respective second frame element of the identical first and second frame elements, and
wherein the at least one connecting internal strut member of the respective second frame element connects an inner frame of the respective second frame element with an outer frame of the respective second frame element.

9. The modular flow system according to claim 1,
wherein the vapor and/or liquid channel comprises the at least one non-connecting internal strut member, the vapor and/or liquid channel being connected to the central inner region by at least one vapor and/or liquid channel opening constituting a through hole in the inner frame.

10. The modular flow system according to claim 1,
wherein the frame elements comprise:
a first frame element comprising on both sides of the central inner region a film, and
a second frame element comprising on both sides a water-tight, vapor-permeable membrane,
wherein when the first and second frame elements are stacked, the at least one non-connecting internal strut member of the first frame element is aligned with an at least one connecting internal strut member of the second frame element, and
wherein the at least one connecting internal strut member of the second frame element connects an inner frame of the second frame element with an outer frame of the second frame element.

11. The modular flow system according to claim 1,
wherein at least one passage opening is centrally arranged between the vapor and/or liquid channels.

12. The modular flow system according to claim 1,
wherein each frame element is provided on only one frontal side only or on both opposing frontal and back sides with a welding web structure which defines a region including the passage openings and the central inner region and defines at least two regions each including a vapor and/or liquid passage.

13. The modular flow system according to claim 1,
wherein a welding web structure provides a welding web configured such that the vapor and/or liquid channels are separated from each other, wherein the at least one internal strut member is only partially provided with the welding web.

14. The modular flow system according to claim 1,
wherein the outer frame comprises additional outer strut members, and/or
wherein the inner frame and the outer frame are connected by additional intermediate strut members which are arranged outside the vapor and/or liquid channels and are arranged outside a drain passage.

15. The modular flow system according to claim 1,
wherein outer strut members are provided with a welding web structure.

16. The modular flow system according to claim 1,
wherein a welding web structure defines together with at least one strut member on which it is provided at least one other passage opening for other functions of the modular flow system than a membrane distillation stage,
wherein the at least one strut member comprises at least one of: an outer strut member, the at least one non-connecting internal strut member, an at least one connecting internal strut member, or an additional intermediate strut member,
wherein the at least one connecting internal strut member connects the inner frame with outer frame.

17. The modular flow system according to claim 1,
wherein the vapor and/or liquid channels and/or the passage openings and/or a welding web structure of each of the stacked frame elements are aligned with one another, respectively.

18. The modular flow system according to claim 1,
wherein the vapor and/or liquid channels are arranged on the same side of the central inner region and/or of the inner frame.

19. The modular flow system according to claim 1,
wherein the passage openings and the vapor and/or liquid channels are arranged on two opposing sides of the inner frame.

20. The modular flow system according to claim 1,
wherein the inner frames comprise a rectangular form, and/or
the outer frames and/or frame elements comprise a hexagonal form.

21. The modular flow system according to claim 1,
wherein at least one of the plurality of frame elements comprises on both sides of the central inner region a film or on both sides a water-tight, vapor-permeable membrane.

22. The modular flow system according to claim 1,
wherein the frame elements comprise:
a first frame element comprising on both sides of the central inner region a film, and
a second frame element comprising on both sides a water-tight, vapor-permeable membrane, and
wherein the frame elements are arranged in the stack such that each first frame element in the stack alternates with each second frame element in the stack.

\* \* \* \* \*